United States Patent
Xiong

(10) Patent No.: US 12,402,038 B2
(45) Date of Patent: Aug. 26, 2025

(54) METHOD FOR IMPLEMENTING HANDOVER OF MULTICAST BROADCAST SERVICE AND RELATED DEVICES

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 353 days.

(21) Appl. No.: 17/993,857

(22) Filed: Nov. 23, 2022

(65) Prior Publication Data
US 2023/0089834 A1 Mar. 23, 2023

Related U.S. Application Data

(63) Continuation of application No. PCT/CN2021/119908, filed on Sep. 23, 2021.

(30) Foreign Application Priority Data

Feb. 10, 2021 (CN) .......................... 202110184921.8

(51) Int. Cl.
H04W 36/00 (2009.01)
H04W 36/08 (2009.01)
(52) U.S. Cl.
CPC ... *H04W 36/0007* (2018.08); *H04W 36/0019* (2023.05); *H04W 36/08* (2013.01); *H04W 36/0064* (2023.05)
(58) Field of Classification Search
CPC . H04W 36/08; H04W 36/0007; H04W 36/19; H04W 36/0064
See application file for complete search history.

(56) References Cited

U.S. PATENT DOCUMENTS

2020/0404736 A1   12/2020   Zhou et al.
2021/0105196 A1*  4/2021   Dao .................. H04L 43/026
(Continued)

FOREIGN PATENT DOCUMENTS

| CN | 111491346 A | 8/2020 |
| CN | 111526552 A | 8/2020 |
| CN | 112954616 A | 6/2021 |

OTHER PUBLICATIONS

The World Intellectual Property Organization (WIPO) International Search Report for PCT/CN2021/119908 Dec. 29, 2021 7 Pages (including translation).

(Continued)

*Primary Examiner* — Kenny S Lin
(74) *Attorney, Agent, or Firm* — ANOVA LAW GROUP PLLC

(57) ABSTRACT

A method for implementing handover of a multicast broadcast service includes: receiving a handover complete indication transmitted by a target base station, the handover complete indication being used for indicating that a user equipment has been handed over to the target base station; and triggering establishment of a PDU session on a target base station side in response to a determination that the target base station does not support the MBS, S-NSSAI of the PDU session being the same as S-NSSAI of the activated MBS session, and a DNN of the PDU session being the same as a DNN of the activated MBS session, so that a quality of service flow corresponding to the activated MBS session is established in the PDU session, and there being one or more quality of service flows.

20 Claims, 11 Drawing Sheets

(56) References Cited

U.S. PATENT DOCUMENTS

| | | | |
|---|---|---|---|
| 2022/0109515 A1* | 4/2022 | Chervyakov | H04B 17/21 |
| 2022/0217508 A1 | 7/2022 | Xiong | |
| 2022/0225058 A1 | 7/2022 | Xiong | |
| 2022/0322202 A1* | 10/2022 | Li | H04M 15/93 |
| 2023/0082017 A1* | 3/2023 | Hong | H04W 76/22 |
| | | | 370/312 |
| 2023/0089834 A1* | 3/2023 | Xiong | H04W 36/0019 |
| | | | 370/331 |
| 2023/0121491 A1* | 4/2023 | Long | H04W 36/0038 |
| | | | 455/411 |

OTHER PUBLICATIONS

ZTE, "KI#1, discussion and interim conclusion on the several aspect of key issue #1", Oct. 12-23, 2020, SA WG2 Meeting #S2-141E, Electronic, Elbonia.

Huawei, HiSilicon., Solution for KI2: Default GBR QoS Flow, Jul. 2-6, 2018, 3GPP TSG-SA2 Meeting #128, Vilnius, Lithuania.

* cited by examiner

METHOD FOR IMPLEMENTING HANDOVER OF MULTICAST BROADCAST SERVICE AND RELATED DEVICES

RELATED APPLICATION(S)

This application is a continuation application of PCT Patent Application PCT/CN2021/119908 filed on Sep. 23, 2021, which claims the priority of the Chinese Patent Application No. 202110184921.8, entitled "METHOD FOR IMPLEMENTING HANDOVER OF MULTICAST BROADCAST SERVICE AND RELATED DEVICES" filed with the China National Intellectual Property Administration on Feb. 10, 2021, all of which are incorporated herein by reference in entirety.

FIELD OF THE TECHNOLOGY

The present disclosure relates to the field of communication technologies, and in particular, relates to a method for implementing handover of a multicast broadcast service, a user equipment, a session management function, a multicast broadcast unified data management function, and a computer-readable storage medium.

BACKGROUND

Unicast is one-to-one communication, and a unicast source transmits a plurality of different content to different user equipments through routers. For example, and as shown in FIG. 1, five different contents are respectively transmitted to UE 1, UE 2, UE 3, UE 4, and UE 5. The unicast communication has the advantage that different content may be transmitted to different users.

"Multicast" is to transmit same content to a plurality of authorized user equipments. For example, and as shown in FIG. 1, a multicast source simultaneously transmits same content to authorized UE 6, UE 7, and UE 8. Implementation scenarios such as an online video conference and online video on demand are particularly suitable for multicast. Using the multicast mode not only can realize the transmission of data of all target nodes at a time, but also can achieve the purpose of transmitting data to only a specific object (the authorized UEs).

Broadcast is also to transmit same content to a plurality of user equipments. However, no selection of the user equipments is for broadcast.

A 5G (5th generation mobile networks or 5th generation wireless systems, 5th-Generation) multicast broadcast service (MBS) may be met with limitations. For example, only some base stations may support an MBS, and some other base stations do not support the MBS (for example, may include an MBS multicast service and/or an MBS broadcast service). When a UE moves from a 5G base station (which is referred to as a source base station or a source radio access network (RAN) below) or a cell that supports the MBS to a base station (which is referred to as a target base station or a target RAN below) or a cell that does not support the MBS, if the UE has joined the MBS and activated MBS transmission in advance, for example, the UE that has joined an MBS multicast service starts data transmission of the MBS multicast service, the UE may hand over a transmission mode to unicast to continuously transmit data corresponding to the MBS, to achieve MBS continuity.

Before handover, the UE associates an MBS session (an abbreviation of a multicast session or a broadcast session, that is, a multicast or broadcast session, which may be referred to as a multicast broadcast service session and may include, for example, an MBS multicast session or an MBS broadcast session) with a protocol data unit (PDU) session, hands over the PDU session to a target cell or a target RAN, and transmits service data corresponding to the MBS session by using the PDU session.

Because the UE does not learn in advance when a handover occurs (for example, the handover is triggered by the 5G network), to support a handover that may occur at any time, when an MBS session is activated, a PDU session may be established immediately, and the MBS session may be associated with the PDU session before the UE hands over to the target RAN. This causes a waste of resources, because the UE may not be handed over to the target base station that does not support the MBS, or may not be handed over to the target base station that does not support the MBS for a long time such as 2 hours.

To reduce this waste, a plurality of MBS sessions may be jointly associated with one PDU session, to reduce a quantity of wasted PDU sessions. However, one MBS session and one PDU session may correspond to at least one combination of single network slice selection assistance information (S-NSSAI) and a data network name (DNN). Only the MBS session and the PDU session correspond to a same combination of S-NSSAI and a DNN, the MBS session can be associated with the PDU session. However, with the same combination of S-NSSAI and DNN, it is unlikely that there are a plurality of MBS sessions, and different combinations of S-NSSAI and DNN usually correspond to different MBS sessions. Consequently, the MBS sessions of different combinations of S-NSSAI and DNN still may be associated with a plurality of PDU sessions, and a quantity of associated PDU sessions cannot be reduced.

SUMMARY

Various embodiments of the present disclosure provide a method and an apparatus for implementing handover of a multicast broadcast service (MBS), a user plane function, a user equipment, an electronic device, and a computer-readable storage medium.

In one aspect, the present disclosure provide a method for implementing handover of a multicast broadcast service (MBS), applied to a user equipment, a source base station that the user equipment accesses before handover supporting an MBS, and the user equipment already activating an MBS session on the source base station before handover; and the method including: receiving a handover complete indication transmitted by a target base station, the handover complete indication being used for indicating that the user equipment has been handed over to the target base station; and triggering establishment of a protocol data unit (PDU) session on a target base station side in response to a determination that the target base station does not support the MBS, S-NSSAI of the PDU session being the same as S-NSSAI of the activated MBS session, and a DNN of the PDU session being the same as a DNN of the activated MBS session, so that a quality of service flow corresponding to the activated MBS session is established in the PDU session, and there being one or more quality of service flows.

In another aspect, the present disclosure further provide a user equipment, including one or more processors; and a storage apparatus, configured to store one or more computer-readable instructions, the one or more computer-readable instructions, when executed by the one or more processors, causing the one or more processors to implement the method according to the embodiments.

In yet another aspect, the present disclosure provide a method for implementing handover of a multicast broadcast service (MBS), applicable to a session management function (SMF) corresponding to a user equipment, the user equipment being already handed over from a source base station to a target base station, the source base station supporting an MBS, the target base station not supporting the MBS, and the user equipment already activating an MBS session on the source base station before handover; and the method including: obtaining an MBS session identity of the activated MBS session in a process of establishing a protocol data unit (PDU) session on the target base station triggered by the user equipment, S-NSSAI of the PDU session being the same as S-NSSAI of the MBS session, and a DNN of the PDU session being the same as a DNN of the MBS session; determining a multicast broadcast-unified data manager (MB-UDM) of the MBS session according to the MBS session identity; obtaining quality of service flow information corresponding to the activated MBS session from the MB-UDM according to the MBS session identity, there being one or more pieces of quality of service flow information; and establishing a quality of service flow corresponding to the MBS session in the PDU session according to the quality of service flow information corresponding to the activated MBS session, there being one or more quality of service flows.

In yet another aspect, the present disclosure provide a method for implementing handover of a multicast broadcast service (MBS), applied to a multicast broadcast-unified data manager (MB-UDM) corresponding to a user equipment, the user equipment being already handed over from a source base station to a target base station, the source base station supporting an MBS, the target base station not supporting the MBS, and the user equipment being already activating an MBS session on the source base station before handover; and the method including: causing a session management function (SMF) to subscribe to the MB-UDM according to an MBS session identity of the activated MBS session in a process of establishing a protocol data unit (PDU) session on the target base station triggered by the user equipment, S-NSSAI of the PDU session being the same as S-NSSAI of the MBS session, and a DNN of the PDU session being the same as a DNN of the MBS session; and transmitting quality of service flow information corresponding to the activated MBS session to the SMF, so that the SMF establishes a quality of service flow corresponding to the activated MBS session in the PDU session, there being one or more pieces of quality of service flow information.

In yet another aspect, the present disclosure provides computer-readable storage medium, storing computer-readable instructions, the computer-readable instructions, when executed by a processor, implementing the method according to the embodiments.

Details of one or more embodiments of the present disclosure are provided in the accompanying drawings and descriptions below. Other features, objectives, and advantages of the present disclosure become apparent from the present disclosure, the drawings, and the claims.

It is to be understood that the above general descriptions and the following detailed descriptions are merely for exemplary and explanatory purposes, and cannot limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

Figure 1:
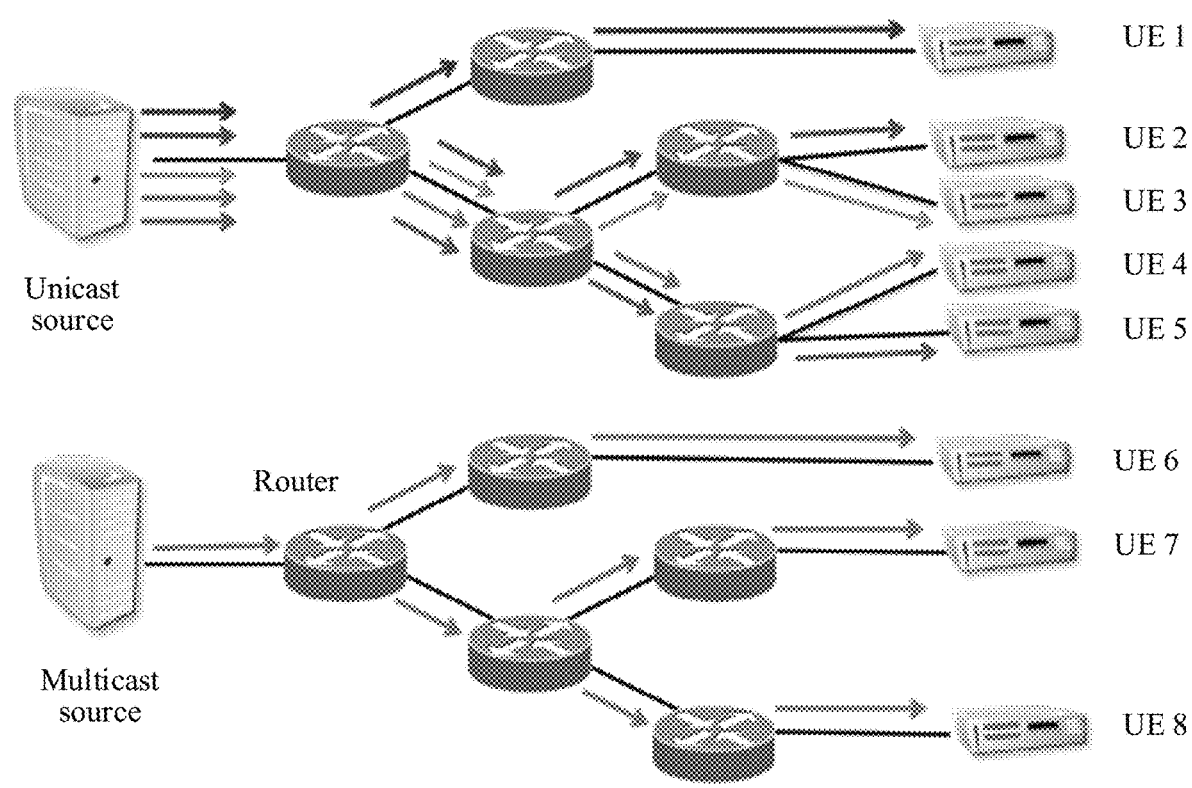
FIG. 1 is a schematic diagram of comparison between unicast IP transmission and multicast IP transmission.
Figure 2:
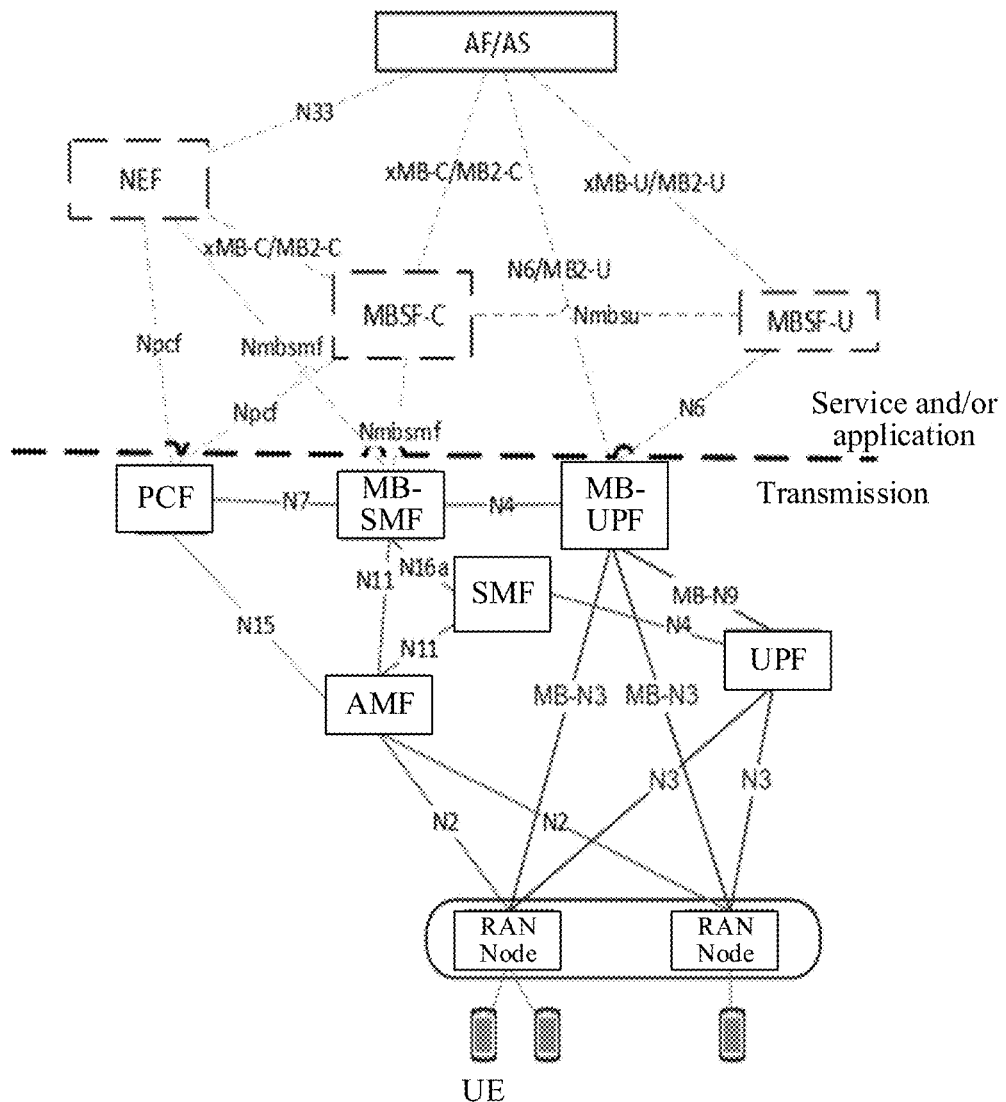
FIG. 2 is a schematic diagram of a reference architecture of a 5G MBS.

An architecture of a 5G MBS is shown in FIG. 2. As shown in FIG. 2, a user plane function (UPF) interacts with a session management function (SMG) through an N4 interface, receives multicast broadcast service (MBS) data from a multicast broadcast (MB)-UPF through an MB-N9 interface, and may further transmit the MBS data to an NG-RAN (a RAN node in FIG. 2) through an N3 interface. The UPF and the MB-UPF are independent in logic but may also jointly use a same UPF entity. A session management function (SMF) may select an MB-SMF for an MBS session and may interact with the MB-SMF to obtain information related to the MBS session. The SMF and the MB-SMF are independent in logic but may also jointly use a same entity. A unified data repository (UDR) or a network function (NF) repository function (NRF) supports discovery of the MB-SMF for the MBS session and stores ID of the selected MB-SMF, that is, MB-SMF ID.

A multicast broadcast service function (MBSF) may include an MBSF user plane function (MBSF-U) and an MBSF control plane function (MBSF-C). The MBSF-C/U are not necessary but are desirable under the following two conditions: when the 5G MBS and a multimedia broadcast/multicast service (MBMS) of 4G or 3G are interconnected, that is, an application function (AF) of 5G and an MBMS application service (AS) of 4G or 3G are a same entity, referring to FIG. 2, or when an operator may perform media processing on an MBS (for example, perform processing such as transcoding or content detection on a video).

The SMF and the UPF may participate in a process of a 5G MBS session, and a related description is made in the following embodiments.

An English full name of NEF in FIG. 2 is network exposure function. An English full name of PCF is policy control function, and Npcf refers to obtaining an Npcf message of a service provided by the PCF. An English full name of AMF is access and mobility management function.

Figure 3:
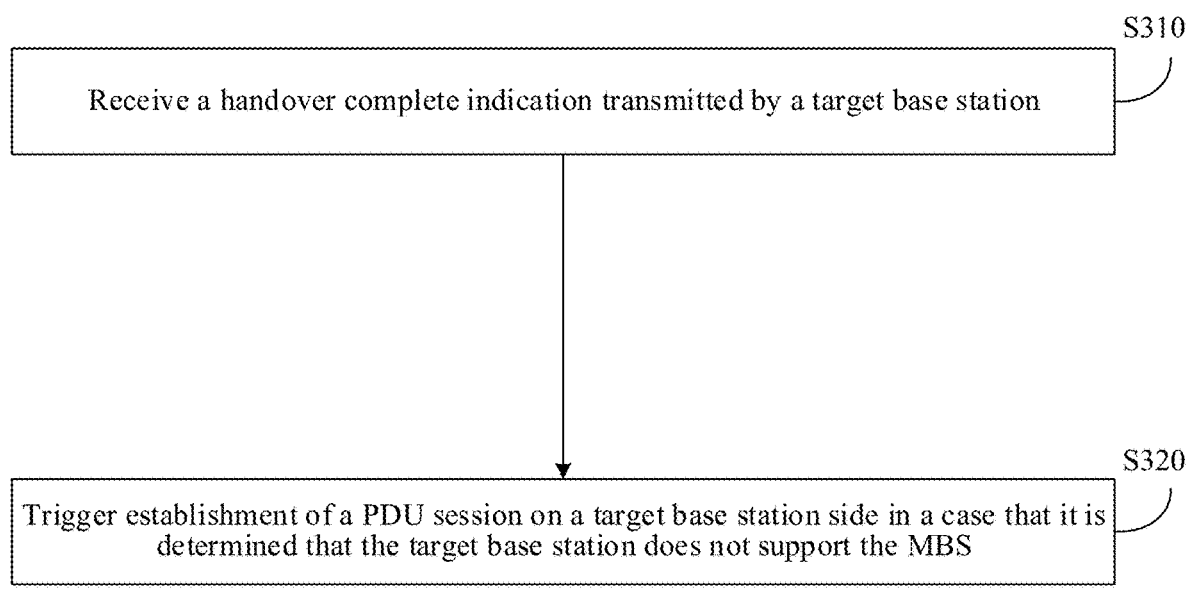
FIG. 3 is a schematic flowchart of a method for implementing handover of a multicast broadcast service according to certain embodiment(s) of the present disclosure.

FIG. 3 schematically shows a flowchart of a method for implementing handover of a multicast broadcast service according to an embodiment of the present disclosure. A description is made by using an example in which any user equipment (UE) performs the method shown in the embodiment of FIG. 3. A base station that the UE accesses before handover is referred to as a source base station, and a base station that the UE accesses after handover is referred to as a target base station. In the following exemplary descriptions, both the source base station and the target base station are NG-RANs in a 5G system, which are respectively referred to as a source NG-RAN (or S-NG-RAN) and a target NG-RAN (or T-NG-RAN). As shown in FIG. 3, the method provided in this embodiment of the present disclosure may include the following steps.

In this embodiment of the present disclosure, it is assumed that the source base station that the UE accesses before handover supports an MBS, the UE has established an MBS session on the source base station before being handed over to a target base station and has activated the MBS session, and the UE has not established a PDU session associated with the MBS session before handover.

It may be understood that if the UE has established the MBS session on the source base station before handover and the MBS session has not been activated, a PDU session establishment procedure may be first triggered, and a PDU session modification procedure is triggered after the MBS session is activated. In the PDU session modification procedure, a quality of service flow (which may be all quality of service flows corresponding to the activated MBS session) corresponding to the activated MBS session after handover is established in a PDU session.

In this embodiment of the present disclosure, an action that the UE clearly may join an MBS but has not started service data transmission is referred to as "register", "join", or "establish". An action that after joining the MBS, the UE starts transmission of MBS data is referred to as "activate" or "service startup", that is, only after a QoS flow is established, an MBS session is "activated". No QoS flow is established, and an MBS session without an MB-UPF is just established.

It may be understood that if the UE has established the MBS session on the source base station before handover, and the MBS session has not been activated, a PDU session may be first established in the PDU session establishment procedure, and after the MBS session is activated, a quality of service flow (which may be all quality of service flows corresponding to the activated MBS session) corresponding to the activated MBS session is established in the PDU session in the PDU session modification procedure.

The solution provided in this embodiment of the present disclosure is applicable to an MBS multicast session or is applicable to an MBS broadcast session. In the following exemplary descriptions, if the MBS multicast session is used as an example for description, it may be extended to the MBS broadcast session, to adaptively modify a corresponding parameter and message. That is, the method for implementing handover of a multicast broadcast service provided in this embodiment of the present disclosure refers to a method for multicast service handover or for broadcast service handover.

Step S310. Receive a handover complete indication transmitted by a target base station, the handover complete indication being used for indicating that the user equipment has been handed over to the target base station.

In this embodiment of the present disclosure, it is assumed that the UE is in a source base station that supports an MBS and has activated an MBS session on a source base station side, and is handed over to a target base station that does not support the MBS. The handover complete indication may be in any form. For example, the target base station transmits an indication of a related physical layer such as a media access control (MAC) layer or a radio link control (RLC) layer or a message of a radio resource control (RRC) layer to the UE. The form of the handover complete indication is not limited in the present disclosure provided that it can be informed that the UE has successfully accessed to the target base station.

Step S320. Trigger establishment of a PDU session on a target base station side in response to a determination that it is determined that the target base station does not support the MBS, S-NSSAI of the PDU session being the same as S-NSSAI of the activated MBS session, and a DNN of the PDU session being the same as a DNN of the activated MBS session, so that a quality of service flow (which may be all quality of service flows corresponding to the activated MBS session) corresponding to the activated MBS session is established in the PDU session, and there being one or more quality of service flows. That is, there may be one or more quality of service flows.

In an exemplary embodiment, the determining that the target base station does not support the MBS may include: receiving a system information block broadcasted by the target base station, and determining, according to the system information block, that the target base station does not support the MBS; or obtaining a target service area of the MBS, and determining, according to the target service area, that the target base station does not support the MBS.

In certain embodiment(s), "a plurality of" refers to at least two. After the UE is handed over from the source base station that supports the MBS to the target base station that does not support the MBS, the UE may learn, by using a system information block (SIB) broadcasted by a target cell system corresponding to the target base station, that a target cell does not support an MBS multicast/broadcast session. Alternatively, the UE may determine, in another manner such as according to a target service area of an MBS multicast/broadcast session, whether the target base station supports the MBS multicast/broadcast session. A manner in which the UE determines whether the target base station supports the MBS is not limited in the present disclosure. The MBS multicast/broadcast session is an MBS multicast session for an MBS multicast session or is an MBS broadcast session for an MBS broadcast session. The character "I" generally indicates an "or" relationship between the associated objects.

In another embodiment, if the UE determines that the target base station after handover also supports the MBS, the UE may directly hand over the activated MBS session on the source base station to an MBS session on the target base station, to achieve service continuity.

In an exemplary embodiment, the triggering establishment of a PDU session on a target base station side may include: transmitting a non-access stratum (NAS) message to an access and mobility management function (AMF), the NAS message carrying a request type, the request type indicating an existing MBS session, so that the AMF selects, according to a value of the request type, an SMF for newly establishing the PDU session.

In an exemplary embodiment, the NAS message may further carry the S-NSSAI, the DNN, and an MBS session identity of the MBS session, so that the SMF establishes the PDU session according to the S-NSSAI, the DNN, and the MBS session identity and establishes the quality of service flow (which may be all the quality of service flows corresponding to the activated MBS session) corresponding to the activated MBS session in the PDU session.

In an exemplary embodiment, the NAS message may further carry a PDU session identity (ID) corresponding to the PDU session and an N1 session management (SM) container, the N1 SM container carrying a PDU session establishment request.

For example, after the UE is handed over to the target base station that does not support the MBS and determines that the target base station does not support the MBS, the UE may initiate a PDU session establishment procedure, to establish the PDU session on the target base station side. The UE may transmit an NAS message to the AMF, the NAS message carrying the following parameters: S-NSSAI, DNN, PDU session ID corresponding to PDU session, request type, MBS multicast session/broadcast session ID (which may also be record as old MBS multicast/broadcast session ID for corresponding to the source base station below) corresponding to MBS multicast session/broadcast session, and N1 SM container, and the N1 SM container carrying a PDU session establishment request.

In this embodiment, the request type indicates an existing MBS session. The existing MBS session may include an existing MBS multicast/broadcast session.

Although in the examples, a description is made by using an example in which one NAS message simultaneously carries S-NSSAI, DNN, PDU session ID, request type, MBS session ID, and N1 SM container, the present disclosure is not limited thereto. In another embodiment, the UE may directly or indirectly transmit a plurality of NAS messages to the AMF, each NAS message carrying at least a part of the content, or the UE may directly or indirectly transmit one or more messages in another form to the AMF provided that the information can be transmitted to the AMF, to inform the AMF that a PDU session may be established currently, and the PDU session is used for replacing the MBS session that has been established and has not been activated on the source base station side. A specific value and expression form of the information are not limited to the examples.

In this embodiment of the present disclosure, the PDU session established on the target base station is used for replacing the MBS session such as the MBS multicast/broadcast session on the source base station, and a combination of S-NSSAI and DNN of the PDU session on the target base station is the same as a combination of S-NSSAI and DNN of the original MBS multicast/broadcast session. In this way, service continuity can be maintained.

After receiving the NAS message transmitted by the UE, the AMF processes the request type indicating the existing MBS multicast/broadcast session as a newly established PDU session, that is, selects a new SMF. The AMF may establish the PDU session by interacting with the SMF, and establish one or more QoS flows corresponding to the MBS session in the PDU session.

In an exemplary embodiment, the triggering establishment of a PDU session on a target base station side may include: establishing a corresponding PDU session for each MBS session in response to a determination that the user equipment has activated a plurality of MBS sessions on the source base station before handover, S-NSSAI of each MBS session being the same as S-NSSAI of a corresponding PDU session, and a DNN of each MBS session being the same as a DNN of the corresponding PDU session.

In certain embodiment(s), when the UE simultaneously activates a plurality of MBS sessions before handover, each MBS session corresponds to a combination of S-NSSAI and DNN, and a SIB message broadcasted by the target base station may indicate that the MBS is not supported at all, which S-NSSAI does not support the MBS, which DNN does not support the MBS, or which a combination of S-NSSAI or a DNN does not support the MBS session, the UE may determine, according to indication information of the broadcasted SIB message, that a plurality of corresponding PDU sessions are established on the target base station.

In an exemplary embodiment, after the receiving a handover complete indication transmitted by a target base station, the method may further include: performing, in response to a determination that the user equipment is changed to a new tracking area (TA), a registration procedure of registering the user equipment with a network. The UE may trigger the establishment of the PDU session on the target base station side before the registration procedure or after the registration procedure.

In certain embodiment(s), when the UE moves to a new TA, and the new TA is beyond a current service area (registration area) (which may be formed by one or more TAs) of the UE, a registration procedure of which a type is mobility registration update may be performed, so that the UE registers with a network such as a 5G system (5GS) again in the new TA.

In an exemplary embodiment, in response to a determination that the user equipment moves from the source base station to the target base station in an idle state, before the triggering establishment of a PDU session on a target base station side, the method may further include: triggering a service request procedure, so that the user equipment enters a connected state.

For example, if the UE moves from a source base station that supports MBS multicast/broadcast session to another target base station that does not support MBS multicast/broadcast session in an idle state CM-IDLE, the UE may enter a CM-CONNECTED state by using a service request and perform a PDU session establishment procedure.

In an exemplary embodiment, in response to a determination that the user equipment moves from the source base station to the target base station in an idle state and a current tracking area identity of the user equipment is not in a registered tracking area identity list, before the triggering establishment of a PDU session on a target base station side, the method may further include: performing a registration procedure of which a registration type is mobility registration update, so that the user equipment enters a connected state.

For example, if the UE moves from a source base station that supports an MBS multicast/broadcast session to another target base station that does not support the MBS multicast/broadcast session in a CM-IDLE state and the UE finds that a current tracking area identity (TAI) is not in a registered TAI list, the UE first performs a registration procedure of which a registration type is mobility registration update and performs the PDU session establishment procedure in response to a determination that a signaling connection is not released.

According to the method for implementing handover of a multicast broadcast service provided in the implementations of the present disclosure, on one hand, in response to a determination that a UE has activated an MBS session in a source base station before handover, and after being handed over from the source base station that supports an MBS to a target base station that does not support the MBS, the UE triggers establishment of a PDU session on a target base station side, and establishes a quality of service (QoS) flow corresponding to the activated MBS session on a source base station side on the target PDU session. There may be one or more QoS flows (which may be all the QoS flows corresponding to the activated MBS session) corresponding to the activated MBS session, so that when being activated, the MBS session may not be associated with the PDU session, to save resources of the PDU session, thereby maintaining service continuity of the MBS. On the other hand, in this manner, modification to the 5G system is minimum, and the activated MBS session is handed over to a unicast PDU session when the UE is handed over between the source base station that supports the MBS and the target base station that does not support the MBS.

A handover procedure of the UE in 3rd generation partnership project (3GPP) has a plurality of handover scenarios. Two scenarios are listed in FIG. 4 and FIG. 6 in the embodiments of the present disclosure, but the method provided in this embodiment of the present disclosure is not limited to the two scenarios, for example, the method is further applicable to two scenarios of "Xn based inter NG-RAN handover with insertion of intermediate UPF" and "Xn based inter NG-RAN handover with intermediate UPF re-allocation". The method provided in this embodiment of the present disclosure is to add a PDU session establishment procedure before or after a registration procedure (for example, step 9 in FIG. 4 or step 12 in FIG. 6, or even as shown in FIG. 4, the registration procedure may not exist).

A 5G radio access network includes two nodes: gNB and ng-eNB, and an interface between gNB and gNB, an interface between gNB and ng-eNB, and an interface between ng-eNB and gNB are all Xn interfaces, the Xn interfaces being network interfaces between NG-RAN nodes.

In this embodiment of the present disclosure, if the UE has activated an MBS session on a source NG-RAN side before being handed over to a target NG-RAN, that is, the UE has established one or more QoS flows, the PDU session establishment procedure may be preferentially advanced to the registration procedure, but the present disclosure is not limited thereto. The PDU session establishment procedure may alternatively be placed after the registration procedure. If the UE has not activated the MBS session on the source NG-RAN side before being handed over to the target NG-RAN, that is, has not established the QoS flows, the PDU session establishment procedure may be preferentially performed after the registration procedure. However, the PDU session establishment procedure may alternatively be advanced to the registration procedure.

Figure 4:
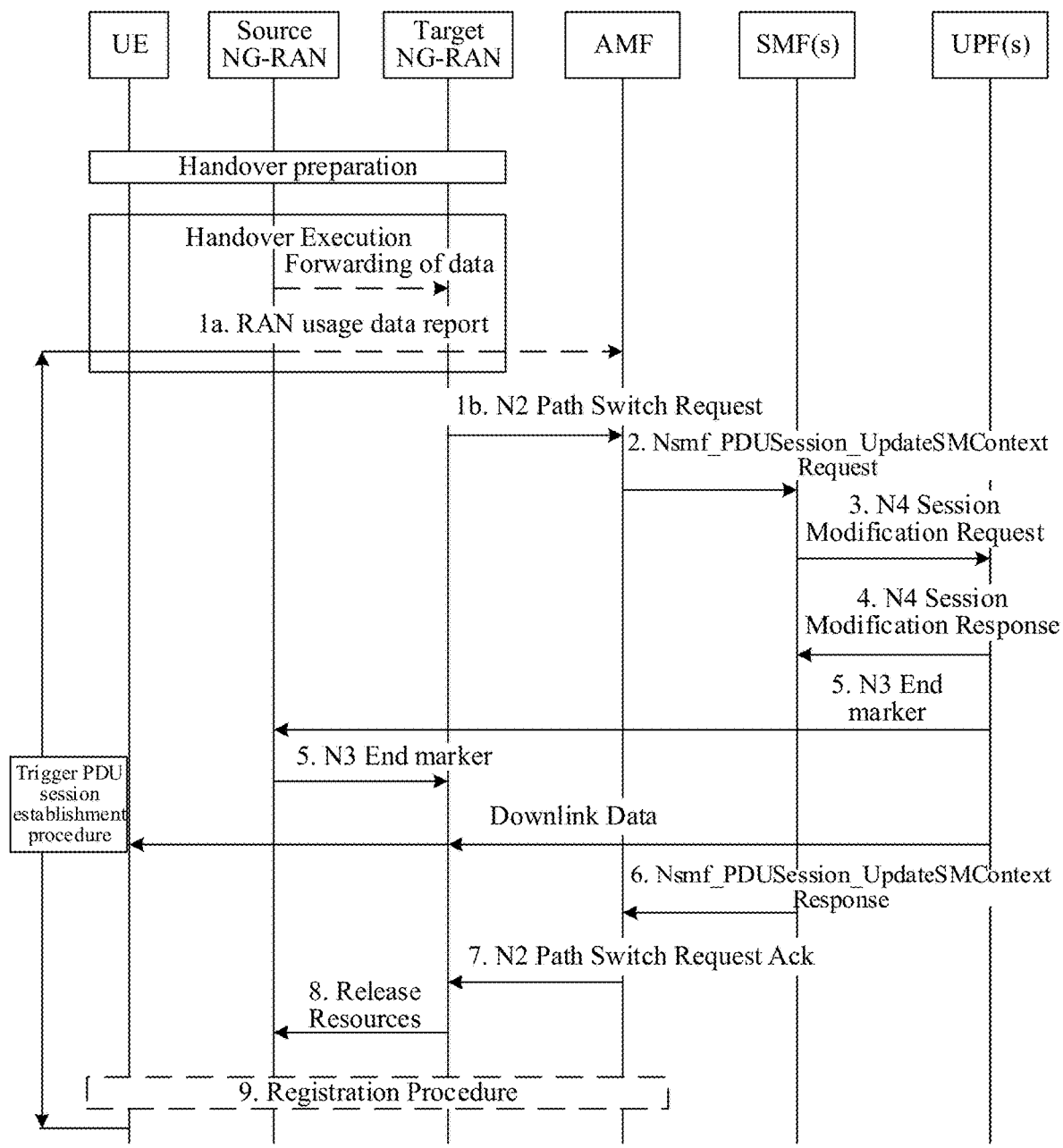
FIG. 4 is a schematic diagram of Xn based inter NG-RAN handover without UPF re-allocation according to certain embodiment(s) of the present disclosure.

FIG. 4 schematically shows a schematic diagram of Xn based inter NG-RAN handover without UPF re-allocation according to an embodiment of the present disclosure.

As shown in FIG. 4, the UE is handed over from a source NG-RAN to a target NG-RAN at a handover preparation phase and a handover execution phase, the source NG-RANG supporting MBS multicast/broadcast session, and the target NG-RAN not supporting MBS multicast/broadcast session. After the UE is handed over from the source NG-RAN to the target NG-RAN, the target NG-RAN transmits a handover complete indication to the UE. After receiving the handover complete indication, the UE may learn that the UE has successfully accessed to the target NG-RAN. The UE may trigger a PDU session establishment procedure shown in FIG. 5. The PDU session establishment procedure shown in FIG. 5 triggered by the UE is independent of a communication procedure on a network side in FIG. 4. Therefore, the UE may trigger the PDU session establishment procedure at any moment between step 1*a* and step 8 in FIG. 4, that is, may trigger the PDU session establishment procedure shown in FIG. 5 before step 9 in FIG. 4, or may trigger the PDU session establishment procedure shown in FIG. 5 after step 9 in FIG. 4. In addition, step 9 in FIG. 4 is performed selectively.

If a public land mobile network (PLMN) has configured a secondary radio access technology (RAT) usage report, at the handover execution phase, the source NG-RANG may provide a RAN usage data report, that is, RAN usage data report (N2 SM information (secondary RAT usage data), handover flag, source to target transparent container), to an AMF. The handover flag indicates that the AMF is to buffer N2 SM information before forwarding, the N2 SM information including a usage data report. Source to target transparent container is a source to target transparent container.

In step 1*b* in FIG. 4, a target NG-RAN transmits an N2 path switch request to the AMF, to inform that the UE has moved to a new target cell and provides a list of PDU sessions to be switched.

In step 2 in FIG. 4, the AMF transmits a Nsmf_PDUSession_UpdateSMContext request message to an SMF, that is, a PDU session update session management context request message.

In step 3 in FIG. 4, the SMF transmits an N4 session modification request message to a UPF, that is, an N4 session modification request message.

In step 4 in FIG. 4, the UPF transmits an N4 session modification response message to the SMF, that is, an N4 session modification response message.

In step 5 in FIG. 4, to assist a reordering function in the target NG-RAN, the UPF transmits one or more "end marker" packets for each N3 tunnel. The UPF starts transmitting downlink data to the target NG-RAN.

In step 6 in FIG. 4, the SMF transmits a Nsmf_PDUSession_UpdateSMContext response message to the AMF, that is, a PDU session update session management context response message.

In step 7 in FIG. 4, the AMF transmits an N2 path switch request Ack (that is, an N2 path switch request acknowledgment) to the target NG-RAN.

In step 8 in FIG. 4, by transmitting a release resource message to the source NG-RAN, the target NG-RAN confirms success of the handover. The target NG-RAN triggers resource release of the source NG-RAN.

The registration procedure is shown in step 9 in FIG. 4.

Figure 5:
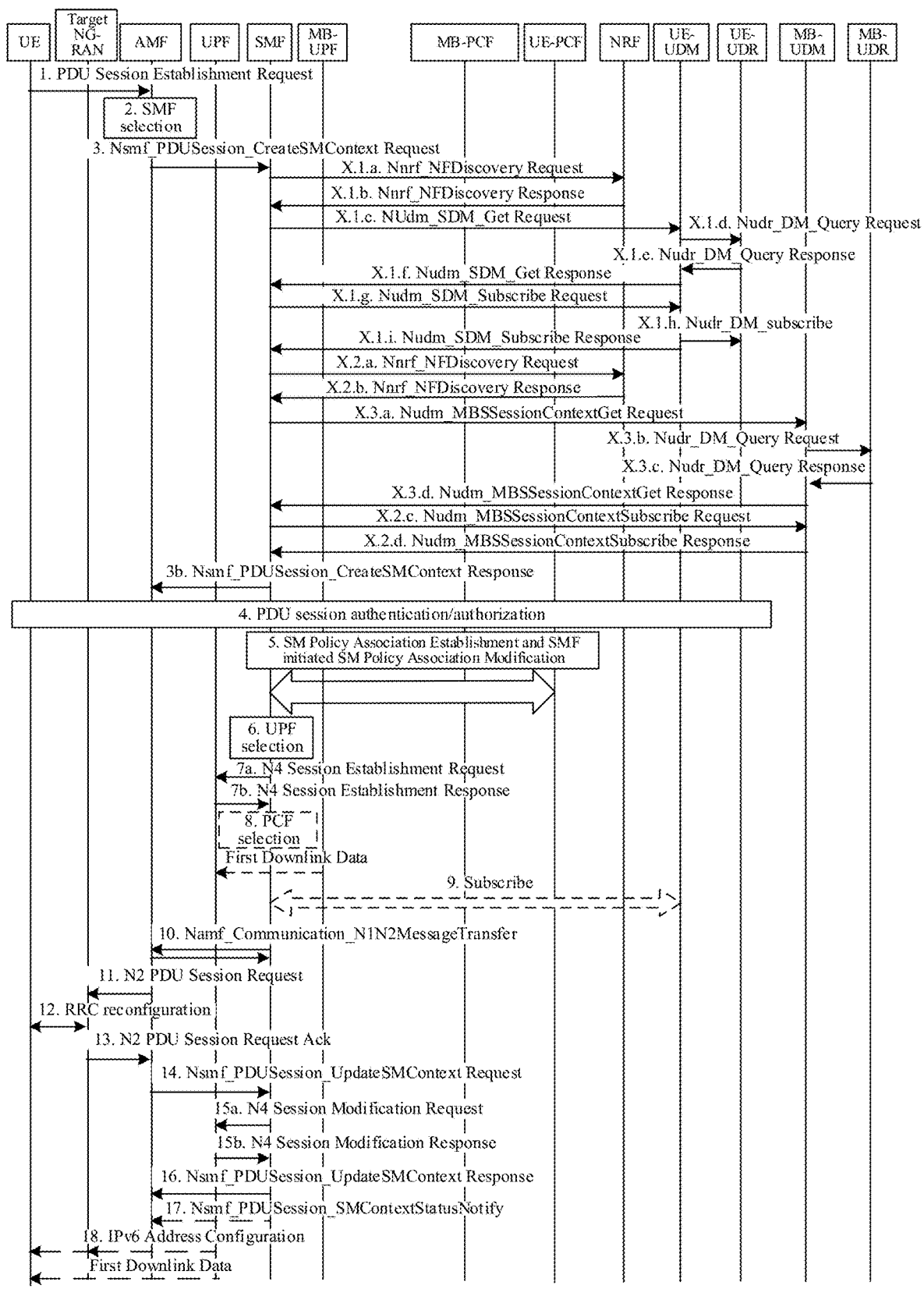
FIG. 5 is a schematic diagram of a process of triggering establishment of a target PDU session on a target NG-RAN side according to certain embodiment(s) of the present disclosure.

FIG. 5 schematically shows a schematic diagram of a process of triggering establishment of a target PDU session on a target NG-RAN side according to an embodiment of the present disclosure.

The UE learns at the handover preparation phase in FIG. 4 that the UE may be handed over to the target NG-RAN, and the UE learns, by using a SIB message broadcasted by a target cell, that the target cell does not support MBS multicast/broadcast session and triggers the PDU session establishment procedure shown in FIG. 5. The PDU session establishment procedure may be added before or after step 9 in FIG. 4.

As shown in FIG. 5, in step 1 in FIG. 5, the UE transmits an NAS message (S-NSSAI(s), UE requested DNN, PDU session ID, request type, old MBS session ID, N1 SM container (PDU session establishment request, [port management information container])) to the AMF.

It can be learned that the NAS message carries a request type, the request type indicating an existing MBS multicast/broadcast, that is, a new request type being increased.

Old MBS session ID indicates an old MBS multicast/broadcast session ID, which represents an MBS multicast/broadcast session identity (an MBS multicast/broadcast session ID is directly used below) corresponding to an MBS multicast/broadcast session. Old MBS session ID indicates an old MBS multicast session ID, which represents that an MBS multicast service is switched, or old MBS session ID indicates an old MBS broadcast session ID, which represents that an MBS broadcast service is switched.

An N1 SM container, that is, an N1 session management container, carries a PDU session establishment request. Port Management Information Container represents a port management information container.

The S-NSSAI and the DNN in the NAS message correspond to the S-NSSAI and the DNN of the old MBS multicast/broadcast session. The PDU session established on the target NG-RAN side is used for replacing the MBS multicast/broadcast session on the source NR-RAN side, and a combination of S-NSSAI and DNN of the PDU session on the target NG-RAN is the same as a combination of S-NSSAI and DNN of the original MBS multicast/broadcast session. In this way, service continuity can be maintained.

When the UE simultaneously activates a plurality of MBS multicast/broadcast sessions, each MBS multicast/broadcast session corresponds to a combination of S-NSSAI and DNN, and a broadcasted SIB message may indicate that the MBS multicast/broadcast is not supported at all, which S-NSSAI does not support the MBS multicast/broadcast, which DNN does not support the MBS multicast/broadcast, or which a combination of S-NSSAI or a DNN does not support the MBS multicast/broadcast session, the UE may determine, according to indication information of the broadcasted SIB message, that a plurality of corresponding PDU sessions are established on the target NG-RAN side. The plurality of MBS multicast/broadcast sessions may be switched to corresponding PDU sessions in parallel or a switching order may be determined according to presence or absence of a service (that is, whether the MBS session has been activated and whether a QoS flow of an MBS session is present).

For example, if the UE has five MBS multicast/broadcast sessions, because the target NG-RAN does not support the MBS multicast/broadcast session, the five MBS multicast/broadcast sessions may be simultaneously switched to corresponding PDU sessions, and a handover procedure of each MBS multicast/broadcast session may be performed independently, for example, may be performed in parallel without a precedence relationship, or some of the five MBS multicast/broadcast sessions, for example, three MBS multicast/broadcast sessions, that have services are switched first, some other of the five MBS multicast/broadcast sessions, for example, two MBS multicast/broadcast sessions, that have no service are switched later, so that it can be ensured that the MBS multicast/broadcast sessions with the services are switched in real time, to maintain service continuity.

In the embodiment of FIG. 5, there is an interface between the SMF and the PCF, that is, there may be two PCFs in FIG. 5, one PCF is connected to the MB-SMF, which is referred to as an MB-PCF, and may be configured to provide MBS multicast/broadcast session context information for policy control of the entire 5G MBS session, and the other PCF is connected to the SMF, which is referred to as a UE-PCF and is policy used for controlling the PDU session. It may be understood that the MB-PCF and the UE-PCF are independent in logic but may also be a same PCF entity. The SMF and the MB-SMF (not shown in FIG. 5) are independent in logic but may also be a same SMF entity. A message between the SMF and the MB-SMF does not occur. Similarly, the UPF and the MB-UPF are independent in logic but may be a same UPF entity.

In step 2 in FIG. 5, the AMF processes the request type indicating existing MBS multicast/broadcast session as a newly established PDU session, that is, selects a new SMF (the SMF in FIG. 5 is different from the MB-SMF). The AMF selects an SMF according to S-NSSAI and DNN that are provided by the UE.

In step 3*a* in FIG. 5, the AMF transmits a Nsmf_PDUSession_CreateSMContext request message (that is, a protocol data unit session establishment session management context request message, which is referred to as a PDU session establishment session management context request message) to the selected SMF, the Nsmf_PDUSession_CreateSMContext request message carrying DNN, S-NSSAI, request type, old MBS session ID, and N1 SM container, that is, Nsmf_PDUSession_CreateSMContext request (SUPI, selected DNN, UE requested DNN, S-NSSAI(s), PDU session ID, AMF ID, request type (indicating existing MBS multicast/broadcast session), old MBS session ID, PCF ID, priority access, [small data rate control status], N1 SM container (PDU session establishment request), user location information, access type, RAT type, PEI, GPSI, UE presence in LADN service area, subscription for PDU session status notification, DNN selection mode, trace requirements, control plane CIoT 5GS adjustment indication, or control plane only indicator).

Nsmf_PDUSession_CreateSMContext Request carries a subscription permanent identifier (SUPI), DNN, S-NSSAI, request type (=existing MBS multicast/broadcast session), old MBS session ID=old MBS multicast/broadcast Session ID, and the like. Priority access represents priority access, small data rate control status represents a small data rate control status, user location information represents user location information, access type represents an access type, RAT type represents a RAT type, PEI is an abbreviation of a permanent equipment identifier, GPSI is an abbreviation of a generic public subscription identifier, UE presence in LADN service area represents that the UE exists in a local area data network (LADN) service area, subscription for PDU session status notification represents a subscription for a PDU session status notification, DNN selection mode represents a DNN selection mode, trace requirements represent trace requirements, control plane CIoT 5GS adjustment indication represents a control plane cell Internet of Things (CIoT) 5GS adjustment indicator, and control plane only indicator represents a control plane only indicator.

In the exemplary descriptions, the AMF directly transmits the Nsmf_PDUSession_CreateSMContext Request message to the SMF, the Nsmf_PDUSession_CreateSMContext Request message simultaneously carrying a plurality of pieces of information such as DNN, S-NSSAI, request type, old MBS multicast/broadcast session ID, and N1 SM container, but the present disclosure is not limited thereto. In another embodiment, the AMF may directly or indirectly transmit one or more Nsmf_PDUSession_CreateSMContext Request messages to the SMF, each Nsmf_PDUSession_CreateSMContext Request message carrying at least a part of all the information, or the AMF may transmit messages in another form to the SMF. This is not limited in the present disclosure provided that the SMF can obtained the required information finally.

Step X.1 in FIG. 5 may include the following steps X.1.a to X.1.i.

In step X.1.a, the SMF transmits a Nnrf_NFDiscovery request message (a network function discovery request message, that is, an NF discovery request message) to an NRF, the Nnrf_NFDiscovery request message carrying an SUPI of the UE and an NF type, and the NF type indicating a UDM, to indicate that a UDM ID is obtained from the NRF.

In step X.1.b, after receiving the Nnrf_NFDiscovery request message (SUPI, NF type indicating the UDM), the NRF finds the UDM ID corresponding to the UE, which is referred to as a UE-UDM ID (that is, a user equipment unified data management function identity corresponding to a user equipment unified data management function) in response to the Nnrf_NFDiscovery request message (SUPI, NF type indicating the UDM), and returns Nnrf_NFDiscovery response message (UE-UDM ID), that is, an NF discovery response message, to the SMF.

In step X.1.c, after receiving the Nnrf_NFDiscovery response message from the NRF, the SMF may learn the UDM corresponding to the UE according to the UE-UDM ID carried in the Nnrf_NFDiscovery response message. Therefore, the SMF may transmit a Nudm_SDM_Get request message (a data management get request message) to a UE-UDM corresponding to the UE-UDM ID, the Nudm_SDM_Get request message carrying the UE-UDM ID and the SUPI of the UE.

In step X.1.d, after receiving the Nudm_SDM_Get request message from the SMF, the UE-UDM may transmit a Nudr_DM_Query request message (a data management query request message) to a UE-UDR, the Nudr_DM_Query request message carrying the SUPI of the UE.

In this embodiment of the present disclosure, a UDR corresponding to the UE-UDM is referred to as a user equipment unified data repository (UE-UDR). A UDM corresponding to the MBS session such as the MBS multicast/broadcast session is referred to as an MB-UDM, that is, a multicast broadcast unified data management function, and a UDR corresponding to the MB-UDM is referred to as an MB-UDR, that is, a multicast/broadcast unified data repository.

It may be understood that in this embodiment of the present disclosure, the MB-UDR and the UE-UDR may be a same UDR or may be different UDRs.

In step X.1.e, after receiving the Nudr_DM_Query request message from the UE-UDM, the UE-UDR may return a Nudr_DM_Query response message (a data management query response message) to the UE-UDM in response to the Nudr_DM_Query request message, the Nudr_DM_Query response message including MBS session management subscription data of the MBS multicast/broadcast session.

In step X.1.f, after receiving the Nudr_DM_Query response message from the UE-UDR, the UE-UDM may return a Nudm_SDM_Get response message (a data management get response message) to the SMF in response to the Nudm_SDM_Get request message, the Nudm_SDM_Get response message carrying the MBS session management subscription data of the MBS multicast/broadcast session.

In step X.1.g, after receiving the Nudm_SDM_Get response message, the SMF may transmit a Nudm_SDM_Subscribe request message (a data management subscribe request message) to the UE-UDM, the Nudm_SDM_Subscribe request message carrying the SUPI, the MBS session management subscription data of the MBS multicast/broadcast session, the DNN, and the S-NSSAI.

In step X.1.h, after receiving the Nudm_SDM_Subscribe request message, the UE-UDM may transmit a Nudm_SDM_Subscribe message (a data management subscription message) to the UE-UDR, the Nudm_SDM_Subscribe message carrying the MBS session management subscription data of the MB S multicast/broadcast session.

In step X.1.i, the UE-UDM may return a Nudm_SDM_Subscribe response message (a data management subscribe response message) to the SMF.

In step X.1 in the embodiment of FIG. 5, the session management subscription data in Nudm_SDM_Get (which includes request and response messages) and the session management subscription data in Nudm_SDM_Subscribe (which includes request and response messages) indicate MBS session management subscription data. Similarly, the session management subscription data in Nudr_DM_Query (which includes request and response messages) and the session management subscription data in Nudr_DM_Subscribe (which includes request and response messages) indicate MBS session management subscription data.

In step X.1 in the embodiment of FIG. 5, the SMF queries the NRF by using the SUPI of the UE for the UE-UDM. In step X.1 in the embodiment of FIG. 5, the UE-UDM is configured to store the MBS session management subscription data of the UE and may learn, according to the MBS session management subscription data, whether S-NSSAI and DNN have been subscribed. If no subscription, the following steps in FIG. 5 are not performed. That is, in step X.1, whether a PDU session is allowed to be established is checked, the MBS session management subscription data including a plurality of pieces of information such as an allowed maximum bandwidth and billing.

If the UE has a plurality of MBS multicast/broadcast sessions, which are switched to corresponding unicast PDU sessions, the UE perform the entire process in FIG. 5 for each PDU session. Therefore, S-NSSAI and a DNN of a PDU session corresponding to each MBS multicast/broadcast session are specified in all the processes.

A step X.2 is further added in this embodiment of the present disclosure and may include step X.2.*a* to step X.2.*d*.

In step X.2.*a*, the SMF transmits a Nnrf_NFDiscovery request message (a network function discovery request message) to the NRF, the Nnrf_NFDiscovery request message carrying an MBS session ID, that is, the MBS session ID indicating MBS multicast/broadcast session ID and an NF type, and the NF type indicating an MBS UDM, to indicate that an MB-UDM ID is obtained from the NRF. If the MBS session ID indicates an MBS multicast session ID, it indicates that an MB-UDM ID corresponding to the MBS multicast session ID is queried. If the MBS session ID indicates an MBS broadcast session ID, it indicates that an MB-UDM ID corresponding to the MBS broadcast session ID is queried.

In step X.2.*b*, when receiving the Nnrf_NFDiscovery request message in step X.2.*a*, the NRF may learn, according to the MBS session ID indicating the MBS multicast/broadcast session ID and the NF type indicating the MBS UDM in the Nnrf_NFDiscovery request message in step X.2.*a*, that the MB-UDM ID corresponding to the MBS multicast/broadcast session may be queried. Therefore, the NRF returns Nnrf_NFDiscovery response message (a network function discovery response message) to the SMF, the Nnrf_NFDiscovery response message carrying an MB-UDM ID (a multicast broadcast unified data management function identity of a multicast broadcast unified data management function).

In the embodiment of FIG. 5, the SMF queries the NRF for an MB-UDM by using old MBS multicast/broadcast session ID and subscribes to the MB-UDM by using Nudm_MBSSessionContextSubscribe Request (MBS Multicast/Broadcast Session ID, notification correlation identity, MB-SMF ID). The subscription is used for the MB-UDM to notify the SMF when the MBS multicast/broadcast session status and information stored in the MB-UDM are changed.

A main difference between the new step X.2 and step X.1 is that in step X.1, the SMF may obtain the UE-UDM by querying the NRF through the SUPI of the UE, but in step X.2, the SMF obtains the MB-UDM by querying the NRF through the MBS multicast/broadcast session ID rather than through the SUPI of the UE. Therefore, the MB-UDM and the UE-UDM of step X.2 are two UDMs that are different from those of step X.1, and the MB-UDM is the UDM serving the MB-SMF, that is, the UDM corresponding to the MBS session context information.

The embodiment of FIG. 5 further includes step X.3, which may include steps X.3.*a* to X.3.*d*.

In step X.3.*a*, the SMF transmits Nudm_MBSSessionContextGet request message (an MBS session context get request message) to the MB-UDM, an MBS session ID carried in the Nudm_MBSSessionContextGet request message being old MBS multicast/broadcast session ID.

In step X.3.*b*, after receiving the Nudm_MBSSessionContextGet request message carrying the MBS session ID indicating old MBS multicast/broadcast session ID, the MB-UDM transmits a Nudr_DM_Query request message (a data management query request message) to the MB-UDR, the Nudr_DM_Query request message carrying the MBS session ID, which is old MBS multicast/broadcast session ID and a type indicating MBSSessionInfor (which is used for indicating that MBS session information is obtained).

In step X.3.*c*, after receiving the Nudr_DM_Query request message in step X.3.*b*, the MB-UDR queries for MBS session context information according to the MBS session ID, that is, old MBS multicast/broadcast session ID, and the type indicating MBSSessionInfor in the Nudr_DM_Query request message (if the MBS session ID corresponds to old MBS multicast session ID, the MBS session context information is MBS multicast session context information; and if the MBS session ID corresponds to old MBS broadcast session ID, the MBS session context information is MBS broadcast session context information), and returns Nudr_DM_Query response message (a data management query response message) to the MB-UDM, the Nudr_DM_Query response message carrying a key indicating MBS session ID, a type indicating MBSSessionInformation (that is, multicast broadcast service session information), and data, the data further including MB-SMF ID, MB-UPF ID, MB-PCF ID information, temporary mobile group identity (TMGI), and list of information {QoS flow} (a list of QoS flow information), the list of QoS flow information further including all QoS flows of the MBS multicast/broadcast session (information related to one or more QoS flows (that is, all the QoS flow information) such as QoS flow identity (QFI), QoS flow profile, QoS rule and packet filter, and N4 rule).

In step X.3.*d*, after receiving the Nudr_DM_Query response message, the MB-UDM returns a Nudm_MBSSessionContextGet response message (that is, an MBS session context get response message) to the SMF, the Nudm_MBSSessionContextGet response message carrying the MBS session context information, the MBS session context information including MBS multicast/broadcast session ID, MB-SMF ID, MB-UPF ID, MB-PCF ID, and all the QoS flow information such as all the QoS flow information of QFI, QoS profile, QoS rule and packet filter, and N4 rule listed in FIG. 5 corresponding to the MBS session.

The Nudm_MBSSessionContextGet response message in step X.3.*d* may further include a parameter MB-UPF access information (MB-UPF access information such as IP tunnel access information or a transport layer IP multicast address and a common tunnel endpoint identity (C-TEID)). The transport layer IP multicast address is only used as MBS service data between the UPF and the MB-UPD and the transport layer IP multicast address and the C-TEID are allocated by the MB-UPF.

In this embodiment of the present disclosure, because the MBS multicast session is shared by a plurality of UEs rather than occupied by the only UE, that is, the MBS multicast session ID is shared by the plurality of UEs, the MBS multicast session context information can be obtained according to only the MBS multicast session ID rather than the SUPI of the UE. Similarly, because the MBS broadcast session is shared by a plurality of UEs rather than occupied by the only UE, that is, the MBS broadcast session ID is shared by the plurality of UEs, the MBS broadcast session context information can be obtained according to only the MBS broadcast session ID rather than the SUPI of the UE.

In step X.2.*c*, after receiving the Nnrf_NFDiscovery response message in step X.2.*b*, the SMF may transmit a Nudm_MBSSessionContextSubscribe request message (that is, an MBS session context subscribe request message) to the MB-UDM corresponding to the MB-UDM ID, the Nudm_MBSSessionContextSubscribe request message carrying MBS multicast/broadcast session ID, notification correlation ID, and MB-SMF ID.

Because a plurality of UEs may be handed over to the target RAN (which may be different) that does not support the MBS, and different UEs respectively establish different PDU sessions, which may correspond to different SMFs, through the steps, a plurality of SMFs subscribe to the MB-UDM. Different PDU session establishment procedures corresponding to different SMFs are performed. The SMF learns a corresponding PDU session of which UE through notification association ID.

In step X.2.d, after receiving the Nudm_MBSSessionContextSubscribe request message, the MB-UDM may cause, according to MBS multicast/broadcast session ID and MB-SMF ID carried in the Nudm_MBSSessionContextSubscribe request message, the SMF to subscribe to the MB-UDM, and may return Nudm_MBSSessionContextSubscribe response message (that is, an MBS session context subscribe response message) to the SMF, to inform the SMF that the SMF has successfully subscribed to the MB-UDM.

In step 3b in FIG. 5, the SMF returns a Nsmf_PDUSession_CreateSMContext response message (that is, a protocol data unit session establishment session management context response message) in response to the Nsmf_PDUSession_CreateSMContext request message to the AMF.

In step 4 in FIG. 5, target PDU session authentication/authorization is performed.

If the PCF is deployed and a dynamic policy is used, in step 5 in FIG. 5, an SM policy association establishment and SMF initiated SM policy association modification procedure is performed. The SMF provides the QoS information such as packet filter, 5QI, and ARP of each QoS flow corresponding to the MBS session service flow obtained from the MB-UDM to the selected PCF, to request the PCF to check whether the QoS information of the MBS session service flows meets policy rules of users and networks. The PCF issues a new authorized policy rule according to the policy of the user and the network, that is, the QoS information such as packet filter, 5QI, and ARP of each MBS session service flow, and even if the QoS information is not modified, the PCF still may transmit the QoS information of the MBS session service flow provided by the SMF to the SMF again.

If the selected PCF is the MB-PCF, and the Npcf_SMPolicyControlCreate Request message transmitted by the SMF to the MB-PCF further includes MBS session ID, the MBS session ID indicating MBS multicast/broadcast session ID, which is used for the MBS multicast/broadcast session and corresponding to the MBS multicast/broadcast session, the MB-PCF may adopt corresponding authorized policy rules to the SMF according to the user, the network, and the MBS multicast/broadcast session ID. That is, QoS information such as packet filter, 5QI, and ARP of each MBS session service flow, even if the QoS information is not modified, the PCF still may transmit the QoS information of the MBS session service flow provided by the SMF to the SMF again.

In step 6 in FIG. 5, the SMF selects a UPF. If the SMF finds that the SMF is an MB-SMF, the SMF directly selects an MB-UPF as the UPF.

In step 7a in FIG. 5, the SMF transmits an N4 Session Establishment Request (N4 session establishment request) message to the selected UPF.

In step 7b in FIG. 5, the UPF transmits an N4 Session Establishment Response (N4 session establishment response) message to the SMF for confirmation.

If the PCF is deployed and the dynamic policy is used, in step 8 in FIG. 5, the SMF selects a PCF, that is, selects a UE-PCF in FIG. 5. The SMF may reuse the MB-PCF selected according to the MBS multicast/broadcast session as the UE-PCF, or may re-select a PCF different from the MB-PCF as the UE-PCF for the UE. In this embodiment of the present disclosure, the MB-PCF is preferentially selected according to the MBS multicast/broadcast session ID as the UE-PCF.

The UPF establishes a user plane connection with the MB-UPF, for example, the UPF joins a transport layer IP multicast address allocated by the MB-UPF. The UPF starts receiving, by using the transport layer IP multicast address and a C-TEID, downlink data transmitted by the MB-UPF, and the downlink data is first downlink data received by the UPF.

The SMF subscribes to the UE-UDM for the PDU session.

In step 10 in FIG. 5, the SMF transmits Namf_Communication_N1N2MessageTransfer (that is, a communication N1N2 message transfer message) to the AMF, the SMF requests the AMF for transmitting a message on an N1 interface and a message on an N2 interface, the SMF wants the AMF to respectively forward related information about SM to the UE and the target NG-RAN, and the SMF establishes one or more QoS flows corresponding to the MBS multicast/broadcast session on the target PDU session according to the dynamic policy rule provided by the PCF or the QoS flow information of the MBS multicast/broadcast session provided by the MB-UDM.

In certain embodiment(s), the SMF triggers Namf_Communication_N1N2MessageTransfer ([N2 SM information] (PDU session ID, QFI(s), QoS profile(s), [alternative QoS profile(s)], session-AMBR, [CN tunnel Info(s)], QoS monitoring indication, QoS monitoring reporting frequency, [TSCAI(s)]), N1 SM container (PDU session modification command (PDU Session ID, QoS rule(s), QoS flow level QoS parameters if desired for the QoS Flow(s) associated with the QoS rule(s), QoS rule operation and QoS flow level QoS parameters operation, Session-AMBR))).

The PDU session ID in Namf_Communication_N1N2MessageTransfer is to let the AMF learn that the AMF provides a transfer service for which session of the UE.

N2 SM information is for the target NR-RAN and includes: PDU Session ID, QFI(s), QoS profile(s), core network tunnel information (CN tunnel Info), session-aggregate maximum bit rate (Session-AMBR), and PDU session type. The target NG-RAN configures a plurality of QoS flows of one session by using QoS profile(s). CN tunnel Info is used for identifying the session in a UPF side node of an N3 interface.

N1 SM container is for the UE, which is an SM message, that is, session established accept, and includes: QoS rule(s), S-NSSAI(s), DNN, IP address, and session-AMBR. The UE configures a plurality of QoS flows of one session by using QoS rule(s). The IP address is used for data routing after the UE exits from the UPF.

The QoS profile(s) and the QoS rule(s) mentioned herein are QoS profile and QoS rule that correspond to each QoS flow. If there are a plurality of QoS flows, one message includes QoS profile and QoS rule that correspond to each QoS flow. In 5G, one session and a plurality of QoS flows may be configured once in this manner, to greatly improve signaling efficiency.

In step 11 in FIG. 5, the AMF transmits an N2 PDU session request message (N2 PDU Session Request) to the target NG-RAN.

In certain embodiment(s), N2 PDU Session Request (N2 SM information, NAS message (PDU session ID, N1 SM container (PDU session establishment accept)), [CN assisted RAN parameters tuning]). That is, N2 PDU session request transmitted by the AMF to the target NG-RAN includes NAS message and N2 SM information received from the SMF, NAS message including PDU session ID transmitted to the UE and PDU session establishment accept.

In step 12 in FIG. 5, radio resource control (RRC) reconfiguration is performed between the target NG-RAN and the UE.

In step 13 in FIG. 5, the target NG-RAN transmits an N2 PDU session request acknowledgment (N2 PDU Session Request Ack) to the AMF.

In step 14 in FIG. 5, the AMF transmits a Nsmf_PDUSession_UpdateSMContext request to the SMF.

The AMF transmits Nsmf_PDUSession_UpdateSMContext Request (SM context ID, N2 SM information, request type) to the SMF, and the AMF delivers N2 SM information to the SMF by using an update SM context service provided by the SMF. The N2 SM information has some parameters about the QoS flow(s), and the SMF may update content of session context in time.

In step 15a in FIG. 5, the SMF transmits an N4 session modification request (N4 Session Modification Request) to the UPF, hopes to transmit AN Tunnel Info from the target NG-RAN to conduct an N3 downlink tunnel, and finally informs the UPF of a downlink forwarding rule. N2 SM information has one parameter: AN Tunnel Info, which identifies session in a target NG-RAN side node of the N3 interface. Once the SMF delivers AN Tunnel Info to the UPF, the downlink tunnel of the N3 interface of the session is conducted.

In step 15b in FIG. 5, the UPF returns an N4 session modification response (N4 Session Modification Response) to the SMF.

In step 16 in FIG. 5, the SMF returns a Nsmf_PDUSession_UpdateSMContext response to the AMF.

In step 17 of FIG. 5, the SMF transmits a Nsmf_PDUSession_SMContextStatusNotify message to the AMF.

The UPF transmits Internet Protocol Version 6 (IPv6) address configuration to the target NG-RANG, and the target NG-RANG transmits IPv6 address configuration to the UE. The UPF transmits first downlink data to the UE.

Because the MBS session context get response message transmitted by the MB-UDM to the SMF includes the list of QoS flow information, the SMF may determine that the MBS session has been activated. Therefore, the QoS flow corresponding to the MBS session is established in the PDU session establishment procedure in FIG. 5.

Figure 6:
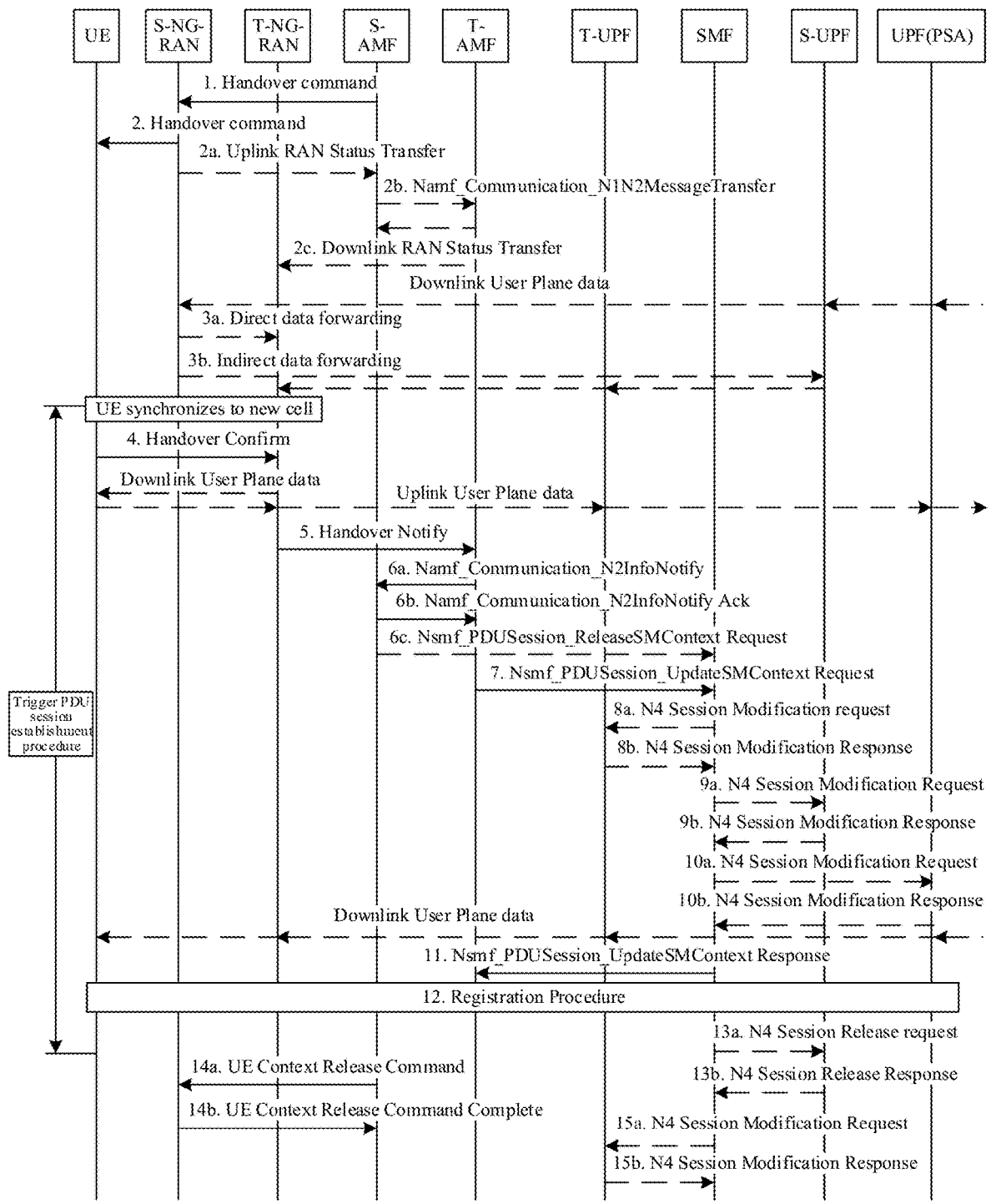
FIG. 6 is a schematic diagram of inter NG-RAN node N2 based handover, execution phase according to certain embodiment(s) of the present disclosure.

FIG. 6 schematically shows a schematic diagram of inter NG-RAN node N2 based handover, execution phase according to an embodiment of the present disclosure. Before FIG. 6, Inter NG-RAN node N2 based handover, preparation phase may further be included.

S-NG-RAN in FIG. 6 refers to a source NG-RAN supporting an MBS or may represent S-RAN corresponding to S-AMF and S-UPF. T-NG-RAN refers to a target NG-RAN not supporting the MBS or may represent T-RAN corresponding to T-AMF and T-UPF. PSA in UPF (PSA) is a PDU session anchor.

In step 1 in FIG. 6, the S-AMF transmits a handover command to the S-RAN.

In step 2 in FIG. 6, the S-RAN transmits the handover command to the UE.

The S-RAN transmits an uplink RAN status transfer (Uplink RAN Status Transfer) message to the S-AMF.

The S-AMF transmits a Namf_Communication_N1N2MessageTransfer service operation to the T-AMF, and the T-AMF acknowledges.

The S-AMF or, if the AMF is relocated, the T-AMF transmits a downlink RAN status transfer message (Downlink RAN Status Transfer message) to the T-RAN.

Uplink packets in FIG. 6 are transmitted from the T-RAN to the T-UPF and the UPF (PSA). Downlink packets are transmitted from the UPF (PSA) to the S-RAN through the S-UPF. The S-RAN is to start forwarding of downlink data from the S-RAN towards the T-RAN. This may be either direct data forwarding (step 3a in FIG. 6) or indirect data forwarding (step 3b in FIG. 6). The UE synchronizes to a new cell (that is, a target cell corresponding to the target base station).

In step 4 in FIG. 6, the UE transmits a Handover Confirm message to the T-RAN, that is, the UE indicates to the network that the UE has handed over to the target RAN. After the UE has successfully synchronized to the target cell, the UE transmits a Handover Confirm message to the T-RAN. Handover is by the Handover Confirm message considered as successful by the UE. After the UE has synchronized to the new cell or the UE has confirmed that the handover succeeds, the UE may trigger the PDU session establishment procedure in the embodiment of FIG. 5 at any time, to establish a target PDU session on the target base station side.

In step 5 in FIG. 6, the T-RAN transmits Handover Notify to the T-AMF.

The T-AMF transmits Namf_Communication_N2InfoNotify to the S-AMF.

The S-AMF transmits Namf_Communication_N2InfoNotify ACK to the T-AMF.

The S-AMF transmits Nsmf_PDUSession_ReleaseSMContext Request to the SMF.

In step 7 in FIG. 6, the T-AMF transmits Nsmf_PDUSession_UpdateSMContext Request to the SMF.

The SMF transmits N4 Session Modification Request to the T-UPF.

The T-UPF transmits N4 Session Modification Response to the SMF.

The SMF transmits N4 Session Modification Request to the S-UPF.

The S-UPF transmits N4 Session Modification Response to the SMF.

The SMF transmits N4 Session Modification Request to the UPF (PSA).

The UPF (PSA) transmits N4 Session Modification Response to the SMF.

In step 11 in FIG. 6, the SMF transmits Nsmf_PDUSession_UpdateSMContext Response to the T-AMF.

In step 12 in FIG. 6, the UE triggers the registration procedure.

The UE may trigger the PDU session establishment procedure shown in FIG. 5 before the registration procedure in step 12 or after the registration procedure in step 12 in FIG. 6.

The SMF transmits an N4 session release request to the S-UPF.

The S-UPF transmits an N4 session release response to the SMF.

In step 14*a* in FIG. 6, the AMF transmits a UE context release command (that is, a UE contact release command) to the S-RAN.

In step 14*b* in FIG. 6, the S-RAN transmits a UE context release command complete (that is, UE context release command complete) to the AMF.

The SMF transmits an N4 session modification request to the T-UPF.

The T-UPF transmits an N4 session modification response to the SMF.

Figure 7:
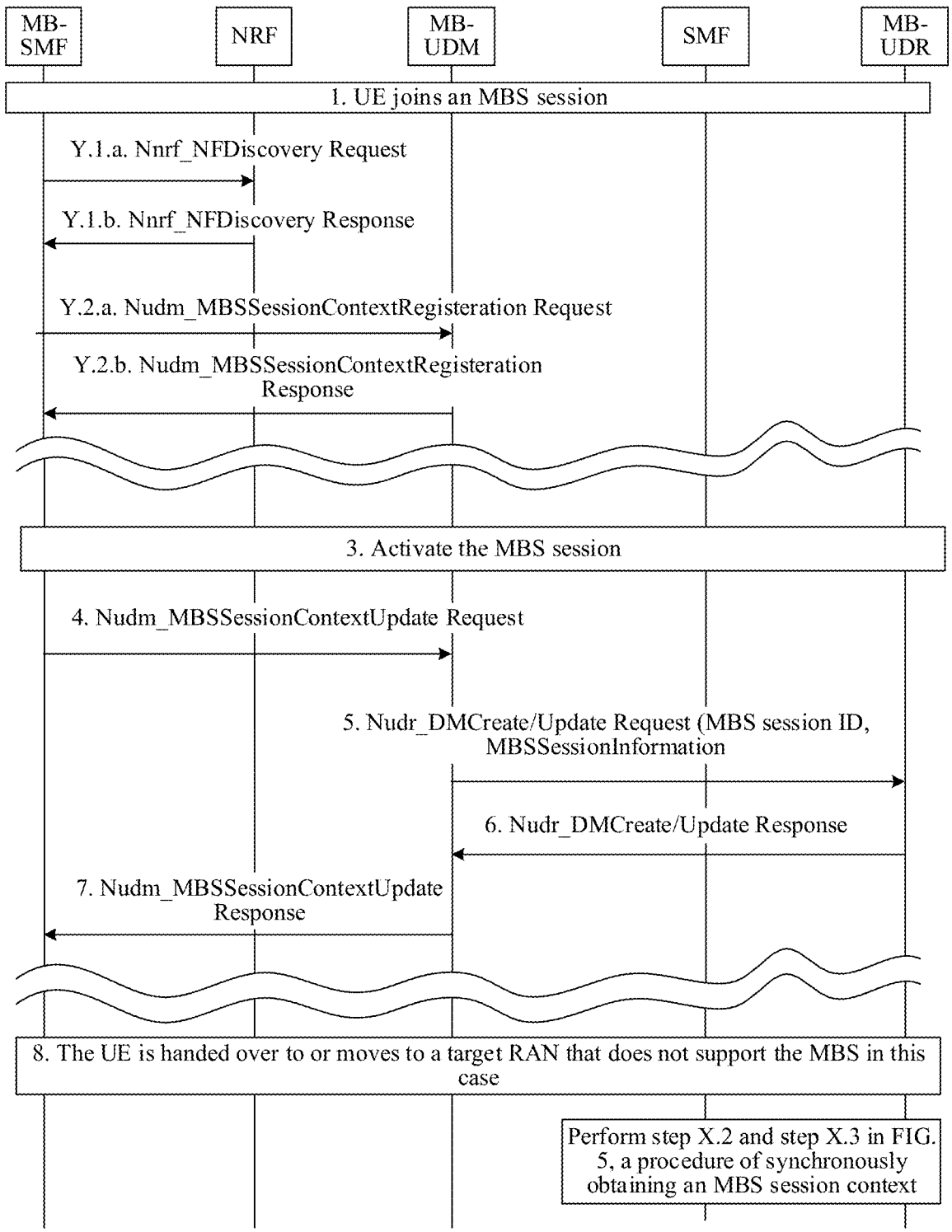
FIG. 7 is a schematic diagram of storage of MBS multicast session context information according to certain embodiment(s) of the present disclosure.

FIG. 7 schematically shows a schematic diagram of storage and obtaining of MBS multicast session context information according to an embodiment of the present disclosure.

In step X.3 in the embodiment of FIG. 5, the SMF may obtain the MBS multicast/broadcast session context information by using the MBS multicast/broadcast session ID. Therefore, in an MBS session such as MBS multicast/broadcast session activation procedure in the embodiment of FIG. 7, related information is stored in a dedicated UDM and UDR, which are referred to as an MB-UDM and an MB-UDR.

In FIG. 7, the process may include the following steps.

In step 1, the UE joins an MBS multicast/broadcast session, that is, before handover, the UE has established an MBS session on a source base station.

In step Y.1.*a*, the MB-SMF transmits a Nnrf_NFDiscovery request to the NRF, the Nnrf_NFDiscovery request carrying an MBS session ID indicating MBS multicast/broadcast session ID and an NF type indicating MBS UDM.

In step Y.1.*b* in FIG. 7, after receiving the Nnrf_NFDiscovery request, the NRF queries a corresponding MB-UDM ID according to the MBS multicast/broadcast session ID and the MBS UDM indicated by the NF type that are carried in the Nnrf_NFDiscovery request, and returns Nnrf_NFDiscovery response to the MB-SMF, the Nnrf_NFDiscovery response carrying the MB-UDM ID.

In step Y.2.*a* in FIG. 7, after receiving the Nnrf_NFDiscovery response, the MB-SMF may transmit a Nudm_MBSSessionContextRegistration request (a multicast broadcast service session context registration request message) to the corresponding MB-UDM according to the MB-UDM ID carried in the Nnrf_NFDiscovery response, the Nudm_MBSSessionContextRegistration request carrying the MBS session ID (which indicates the MBS multicast/broadcast session ID) and an MB-SMF ID.

In step Y.2.*b* in FIG. 7, after receiving the Nudm_MBSSessionContextRegistration request, the MB-UDM registers the MB-SMF with the MB-UDM and returns Nudm_MBSSessionContextRegistration response (that is, a multicast broadcast service session context registration response message) to the MB-SMF.

A delay wave line between step Y.2.*b* and step 3 in FIG. 7 is used for representing that the processes before step 3, step 3, and all processes after step 3 may not be performed together immediately, that is, after step Y.2.*b* may be performed for a period of time, step 3 is performed.

In step 3 in FIG. 7, a 5G network activates an MBS session such as the MBS multicast/broadcast session corresponding to the MBS multicast/broadcast session ID, one or more MBS session QoS flows are established, and an MB-UPF is selected for the MBS session.

In step 4 in FIG. 7, after the MBS session is activated and the MB-UPF is selected for the MBS session, the MB-SMF transmits a Nudm_MBSSessionContextUpdate request (a multicast broadcast service session context update request) message to the MB-UDM, the Nudm_MBSSessionContextUpdate request message carrying MBS multicast/broadcast session ID, MB-SMF ID, MB-UPF ID, MB-PCF ID, transport layer IP multicast address, C-TEID, TMGI, and list of QoS flow information, the list of QoS flow information further including QFI, QoS configuration, QoS rule and packet filter, and N4 rule, that is, the list of QoS flow information including all QoS flow information corresponding to the MBS session, and there being one or more pieces of QoS flow information.

In step 5 in FIG. 7, after receiving the Nudm_MBSSessionContextUpdate request, the MB-UDM transmits a Nudr_DMCreate/Update request to the MB-UDR, the Nudr_DMCreate/Update request carrying MBS multicast/broadcast session ID and MBSSessionInformation, the MBSSessionInformation further including MB-SMF ID, MB-UPF ID, MB-PCF ID, transport layer IP multicast address, C-TEID, TMGI, and list of QoS flow information, and the list of QoS flow information further including QFI, QoS configuration, QoS rule and packet filter, and N4 rule. In addition, MBS multicast/broadcast session ID, MB-SMF ID, MB-UPF ID, MB-PCF ID, transport layer IP multicast address, C-TEID, TMGI, and all the QoS flow information corresponding to the MBS session are stored in the MB-UDM, there being one or more pieces of all the QoS flow information stored in the MB-UDM.

In step 6 in FIG. 7, after receiving the Nudr_DMCreate/Update request message, the MB-UDR stores MBS multicast/broadcast session ID and MBSSessionInformation carried in the Nudr_DMCreate/Update request message in the MB-UDR and returns Nudr_DMCreate/Update response to the MB-UDM.

In step 7 in FIG. 7, after receiving the Nudr_DMCreate/Update response message, the MB-UDM returns Nudm_MBSSessionContextUpdate response message to the MB-SMF.

A delay wave line between step 7 and step 8 in FIG. 7 is used for representing that the processes before step 7 and a process of step 8 may not be performed together immediately, that is, after step 7 may be performed for a period of time, step 8 is performed.

In step 8 in FIG. 7, after the MB-SMF receives the Nudm_MBSSessionContextUpdate response, the UE is handed over from the source RAN that supports the MBS to the target RAN that does not support the MBS, performs step X.2 and step X.3 in the embodiment of FIG. 5, that is, adopts a process of synchronously obtaining an MBS session context in the embodiment of FIG. 5.

Figure 8:
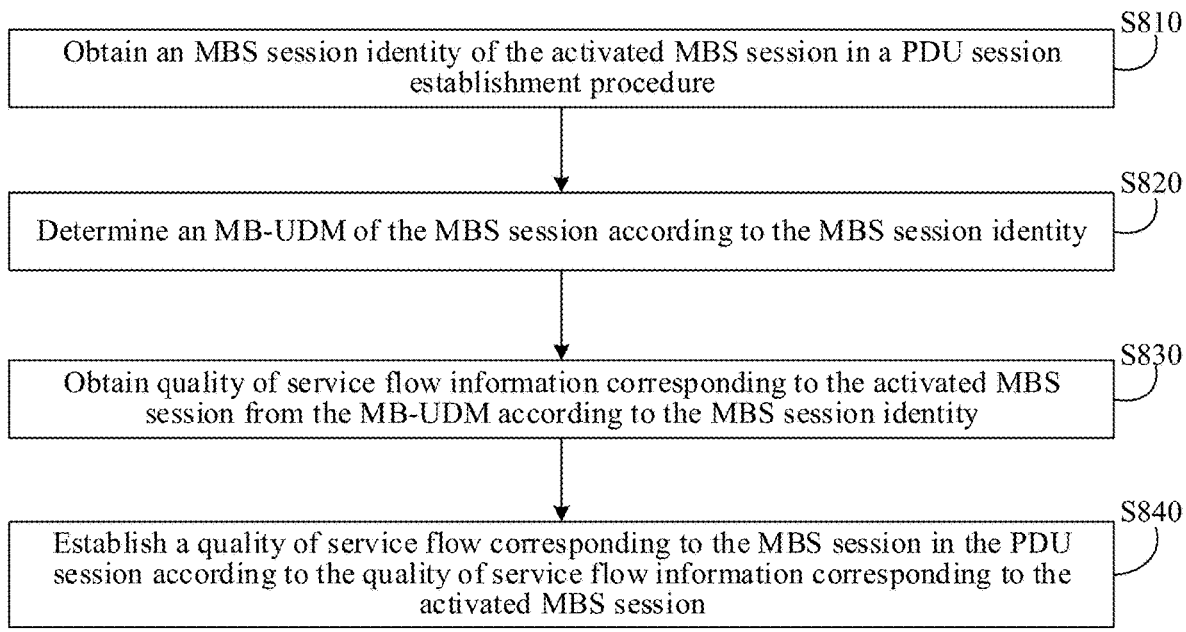
FIG. 8 is a schematic flowchart of a method for implementing handover of a multicast broadcast service according to certain embodiment(s) of the present disclosure.

FIG. 8 schematically shows a flowchart of a method for implementing handover of a multicast broadcast service according to an embodiment of the present disclosure. A description is made by using an example in which the method shown in the embodiment of FIG. 8 is performed by a session management function (SMF) corresponding to a user equipment. The user equipment is already handed over from a source base station to a target base station, the source base station supports an MBS, the target base station does not support the MBS, and the user equipment already activates an MBS session on the source base station before handover and has not established a PDU session associated with the activated MBS session on the source base station. As shown in FIG. 8, the method provided in this embodiment may include the following steps.

Step S810. Obtain an MBS session identity of the activated MBS session in a process of establishing a PDU session on a target base station side triggered by the user equipment, S-NSSAI of the PDU session being the same as S-NSSAI of the MBS session, and a DNN of the PDU session being the same as a DNN of the MBS session.

In an exemplary embodiment, the obtaining an MBS session identity corresponding to the activated MBS session may include: receiving a PDU session establishment session management context request message from an AMF, the PDU session establishment session management context request message including the MBS session identity.

In an exemplary embodiment, the PDU session establishment session management context request message may further include the S-NSSAI, the DNN, a request type, and an N1 session management container, the request type indicating an existing MBS session, and the N1 session management container carrying a PDU session establishment request.

Step S820. Determine an MB-UDM of the MBS session according to the MBS session identity.

In an exemplary embodiment, the determining an MB-UDM of the MBS session according to the MBS session identity may include: transmitting an NF discovery request message to an NRF, the NF discovery request message including the MBS session identity and an NF type, and the NF type indicating an MBS UDM, so that the NRF determines an MB-UDM identity of the MB-UDM according to the MBS session identity and the NF type; and receiving an NF discovery response message returned by the NRF in response to the NF discovery request message, the NF discovery response message carrying the MB-UDM identity.

Step S830. Obtain quality of service flow information corresponding to the activated MBS session from the MB-UDM according to the MBS session identity, there being one or more pieces of quality of service flow information.

In an exemplary embodiment, before the obtaining quality of service flow information corresponding to the activated MBS session from the MB-UDM according to the MBS session identity, the method may further include: transmitting an MBS session context subscribe request message to the MB-UDM according to the MB-UDM identity, the MBS session context subscribe request message including the MBS session identity, a notification correlation identity, and an MB-SMF identity of the MBS session, so that the MB-UDM causes, according to the MBS session identity, the SMF to subscribe to the MB-UDM, the notification correlation identity, and the MB-SMF identity; and receiving an MBS session context subscribe response message returned by the MB-UDM in response to the MBS session context subscribe request message.

In an exemplary embodiment, the obtaining quality of service flow information corresponding to the activated MBS session from the MB-UDM according to the MBS session identity may include: transmitting an MBS session context get request message to the MB-UDM, the MBS session context get request message including the MBS session identity; and receiving an MBS session context get response message returned by the MB-UDM in response to the MBS session context get request message, the MBS session context get response message carrying MBS session context information, the MBS session context information including the MBS session identity, the MB-SMF identity, an MB-UPF identity of the MBS session, an MB-PCF identity, and the quality of service flow information corresponding to the MBS session.

In an exemplary embodiment, after the obtaining quality of service flow information corresponding to the activated MBS session from the MB-UDM according to the MBS session identity, the method may further include: selecting a UPF; and selecting a UE-PCF, In response to a determination that the SMF is the same as an MB-SMF of the MBS session, an MB-UPF of the MBS session is selected as the UPF, and an MB-PCF of the MBS session is selected as the UE-PCF, and the MBS session context get response message further includes multicast broadcast user plane function access information or a transport layer Internet protocol multicast address and a common tunnel endpoint identity.

Step S840. Establish a quality of service flow corresponding to the MBS session in the PDU session according to the quality of service flow information corresponding to the activated MBS session, there being one or more quality of service flows.

In an exemplary embodiment, the establishing a quality of service flow corresponding to the MBS session in the PDU session according to the quality of service flow information corresponding to the activated MBS session may include: transmitting a communication N1N2 message transfer message to an AMF) during establishment of the PDU session, so that the AMF establishes the quality of service flow corresponding to the MBS session in the PDU session according to the quality of service flow information corresponding to the activated MBS session.

In an exemplary embodiment, after the obtaining quality of service flow information corresponding to the activated MBS session from the MB-UDM according to the MBS session identity, the method may further include: selecting a UE-PCF according to the MBS session identity, to preferentially select an MB-UPF of the MBS session as the UE-PCF.

In an exemplary embodiment, before the determining an MB-UDM of the MBS session according to the MBS session identity, the method may further include: determining a UE-UDM according to a SUPI of the user equipment; obtaining MBS session management subscription data of the MBS session from the UE-UDM according to the SUPI; and determining, according to the MBS session management subscription data, that the S-NSSAI and the DNN have been subscribed to the UE-UDM.

For a specific implementation of the method for implementing handover of a multicast broadcast service provided in this embodiment of the present disclosure, reference may be made to the content of the method for implementing handover of a multicast broadcast service in the embodiments. Details are not described herein again.

Figure 9:
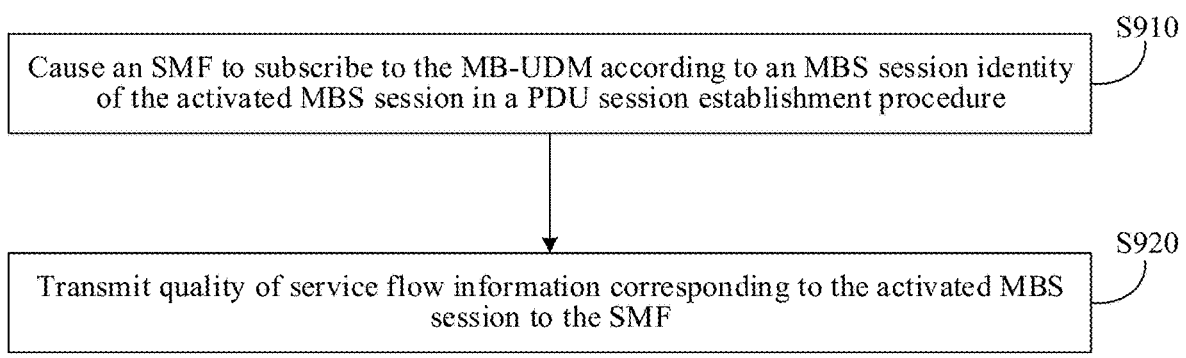
FIG. 9 is a schematic flowchart of a method for implementing handover of a multicast broadcast service according to certain embodiment(s) of the present disclosure.

FIG. 9 schematically shows a schematic flowchart of a method for implementing handover of a multicast broadcast service according to an embodiment of the present disclosure. A description is made by using an example in which the method shown in the embodiment of FIG. 9 is performed by an MB-UDM corresponding to a user equipment. The user equipment is already handed over from a source base station to a target base station, the source base station supports an MBS, the target base station does not support the MBS, and the user equipment already activates an MBS session on the source base station before handover and has not established a PDU session associated with the activated MBS session on the source base station. As shown in FIG. 9, the method provided in this embodiment may include the following steps.

Step S910. Cause an SMF to subscribe to the MB-UDM according to an MBS session identity of the activated MBS session in a process of establishing a PDU session on a target base station side triggered by the user equipment, S-NSSAI of the PDU session being the same as S-NSSAI of the MBS session, and a DNN of the PDU session being the same as a DNN of the MBS session.

In an exemplary embodiment, the causing an SMF to subscribe to the MB-UDM according to an MBS session identity of the activated MBS session may include: receiving an MBS session context subscribe request message transmitted by the SMF, the MBS session context subscribe request message including the MBS session identity, a notification correlation identity, and an MB-SMF identity of the MBS session; causing the SMF to subscribe to the MB-UDM according to the MBS session identity, the notification correlation identity, and the MB-SMF identity; and returning an MBS session context subscribe response message to the SMF in response to the MBS session context subscribe request message.

Step S920. Transmit quality of service flow information corresponding to the activated MBS session to the SMF, so that the SMF establishes a quality of service flow corresponding to the activated MBS session in the PDU session, there being one or more pieces of quality of service flow information.

In an exemplary embodiment, the transmitting quality of service flow information corresponding to the activated MBS session to the SMF may include: receiving an MBS session context get request message transmitted by the SMF, the MBS session context get request message including the MBS session identity; and returning an MBS session context get response message to the SMF in response to the MBS session context get request message, the MBS session context get response message carrying MBS session context information. The MBS session context information may include the MBS session identity, the MB-SMF identity, an MB-UPF identity of the MBS session, an MB-PCF identity, and the quality of service flow information corresponding to the MBS session.

In an exemplary embodiment, the returning an MBS session context get response message to the SMF in response to the MBS session context get request message may include: transmitting a data management query request message to an MB-UDR in response to the MBS session context get request message, a key in the data management query request message indicating the MB S session identity, and a type indicating the MBS session context information; receiving a data management query response message returned by the MB-UDR in response to the data management query request message, a key carried in the data management query response message indicating the MBS session identity, a type indicating MBS session information, and data including the MB-SMF identity, the MB-UPF identity, the MB-PCF identity, and the quality of service flow information corresponding to the MBS session; and returning the MBS session context get response message to the SMF.

In an exemplary embodiment, before the transmitting quality of service flow information corresponding to the activated MBS session to the SMF, the method may further include: receiving an MBS session context update request message from an MB-SMF, the MBS session context update request message carrying the MBS session identity, an MB-SMF identity, an MB-UPF identity, an MB-PCF identity, and the quality of service flow information corresponding to the activated MBS session; storing the MBS session identity, the MB-SMF identity, the MB-UPF identity, the MB-PCF identity, and the quality of service flow information corresponding to the activated MBS session in the MB-UDM; transmitting a data management create/update request message to an MB-UDR, the data management create/update request message carrying the MBS session identity and MBS session information, the MBS session information including the MB-SMF identity, the MB-UPF identity, the MB-PCF identity, and the quality of service flow information corresponding to the MBS session, so that the MBS session identity and the MBS session information are stored in the MB-UDR; receiving a data management create/update response message returned by the MB-UDR in response to the data management create/update request message; and returning an MBS session context update response message to the MB-SMF in response to the MBS session context update request message.

In an exemplary embodiment, before the receiving an MBS session context update request message from an MB-SMF, the method may further include: receiving an MBS session context registration request message from the MB-SMF, the MBS session context registration request message including the MBS session identity and the MB-SMF identity; registering the MB-SMF with the MB-UDM according to the MBS session identity and the MB-SMF identity; and returning an MBS session context registration response message to the MB-SMF in response to the MBS session context registration request message.

For a specific implementation of the method for implementing handover of a multicast broadcast service provided in this embodiment of the present disclosure, reference may be made to the content of the method for implementing handover of a multicast broadcast service in the embodiments. Details are not described herein again.

Although the steps in the flowcharts of the embodiments are displayed sequentially according to instructions of arrows, these steps are not necessarily performed sequentially according to a sequence instructed by the arrows. Unless otherwise explicitly specified in the present disclosure, execution of the steps is not strictly limited, and the steps may be performed in other sequences. In addition, at least some steps in the flowcharts of the embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 10:
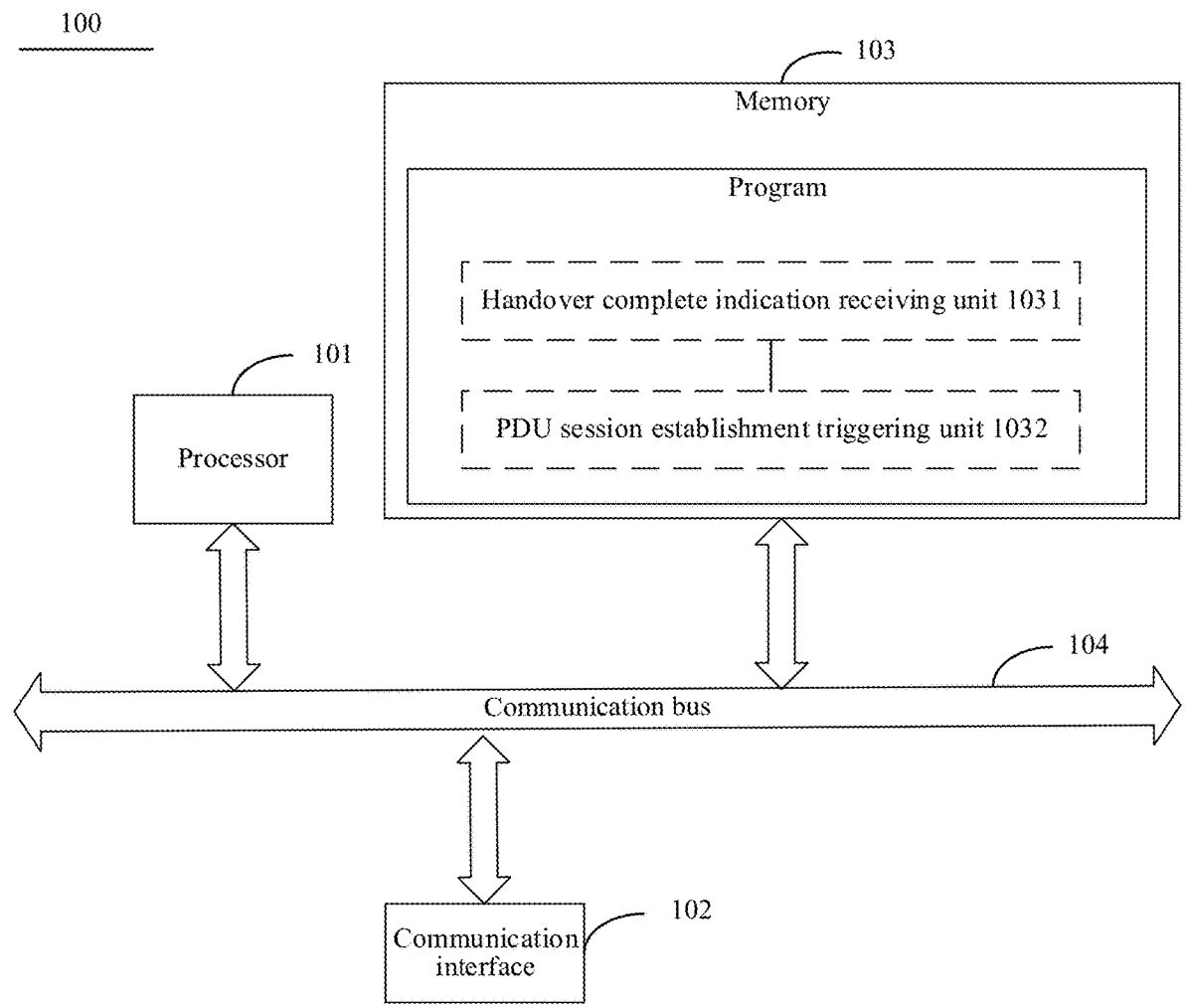
FIG. 10 is a schematic block diagram of a user equipment according to certain embodiment(s) of the present disclosure.

FIG. 10 schematically shows a block diagram of a user equipment 100 according to an embodiment of the present disclosure. As shown in FIG. 10, the user equipment 100 provided in this embodiment of the present disclosure may include: one or more processors 101; and a storage apparatus 103, configured to store one or more computer-readable instructions, the one or more computer-readable instructions, when executed by the one or more processors 101, causing the one or more processors 101 to implement the method according to any one of the embodiments. A source base station that the user equipment 100 accesses before handover supports an MBS, the user equipment 100 has activated an MBS session on the source base station before handover and has not established a PDU session associated with the activated MBS session on the source base station.

The computer-readable instructions may further be configured to: receive a handover complete indication transmitted by a target base station, the handover complete indication being used for indicating that the user equipment has been handed over to the target base station; and trigger establishment of a PDU session on a target base station side in response to a determination that it is determined that the target base station does not support the MBS, S-NSSAI of the PDU session being the same as S-NSSAI of the activated MBS session, and a DNN of the PDU session being the same as a DNN of the activated MBS session, so that a quality of service flow corresponding to the activated MBS session is established in the PDU session, and there being one or more quality of service flows.

Referring to FIG. 10, the computer-readable instructions may be implemented through a program, and the program may include: a handover complete indication receiving unit 1031, configured to receive a handover complete indication transmitted by a target base station, the handover complete indication being used for indicating that the user equipment has been handed over to the target base station; and A PDU session establishment triggering unit 1032, configured to trigger establishment of a PDU session on a target base station side in response to a determination that it is determined that the target base station does not support the MBS, S-NSSAI of the PDU session being the same as S-NSSAI of the activated MBS session, and a DNN of the PDU session being the same as a DNN of the activated MBS session, so that a quality of service flow corresponding to the activated MBS session is established in the PDU session, and there being one or more quality of service flows.

In an exemplary embodiment, the PDU session establishment triggering unit 1032 may be configured to transmit a non-access stratum message to an AMF, the non-access stratum message carrying a request type, and the request type indicating an existing MBS session, so that the AMF selects, according to a value of the request type, an SMF for newly establishing the PDU session.

In an exemplary embodiment, the NAS message may further carry the S-NSSAI, the DNN, and an MBS session identity of the MBS session, so that the SMF establishes the PDU session according to the S-NSSAI, the DNN, and the MBS session identity and establishes the quality of service flow corresponding to the activated MBS session in the PDU session.

In an exemplary embodiment, the non-access stratum message may further carry a PDU session identity corresponding to the PDU session and an N1 session management container, the N1 session management container carrying a PDU session establishment request.

In an exemplary embodiment, the PDU session establishment triggering unit 1032 may be configured to establish a corresponding PDU session for each MBS session in response to a determination that the user equipment has activated a plurality of MBS sessions on the source base station before handover, S-NSSAI of each MBS session being the same as S-NSSAI of a corresponding PDU session, and a DNN of each MBS session being the same as a DNN of the corresponding PDU session.

In an exemplary embodiment, the program may further include: a registration procedure executing unit, configured to perform, in response to a determination that the user equipment is changed to a new TA, a registration procedure of registering the user equipment with a network after the handover complete indication transmitted by the target base station is received. The establishment of the PDU session on the target base station side may be triggered before the registration procedure or after the registration procedure.

In an exemplary embodiment, the PDU session establishment triggering unit 1032 may be configured to receive a system information block broadcasted by the target base station, and determine, according to the system information block, that the target base station does not support the MBS; or obtain a target service area of the MBS, and determine, according to the target service area, that the target base station does not support the MBS.

In an exemplary embodiment, the program may further include: a service request triggering unit, configured to trigger a service request procedure before the establishment of the PDU session on the target base station side is triggered, so that the user equipment enters a connected state in response to a determination that the user equipment moves from the source base station to the target base station in an idle state.

In an exemplary embodiment, the program may further include a registration update executing unit, configured to perform a registration procedure of which a registration type is mobility registration update before the establishment of the PDU session on the target base station side is triggered, so that the user equipment enters a connected state in response to a determination that the user equipment moves from the source base station to the target base station in an idle state and a current tracking area identity of the user equipment is not in a registered tracking area identity list.

For a specific implementation of the user equipment provided in this embodiment of the present disclosure, reference may be made to the content of the method for implementing handover of a multicast broadcast service. Details are not described herein again.

Figure 11:
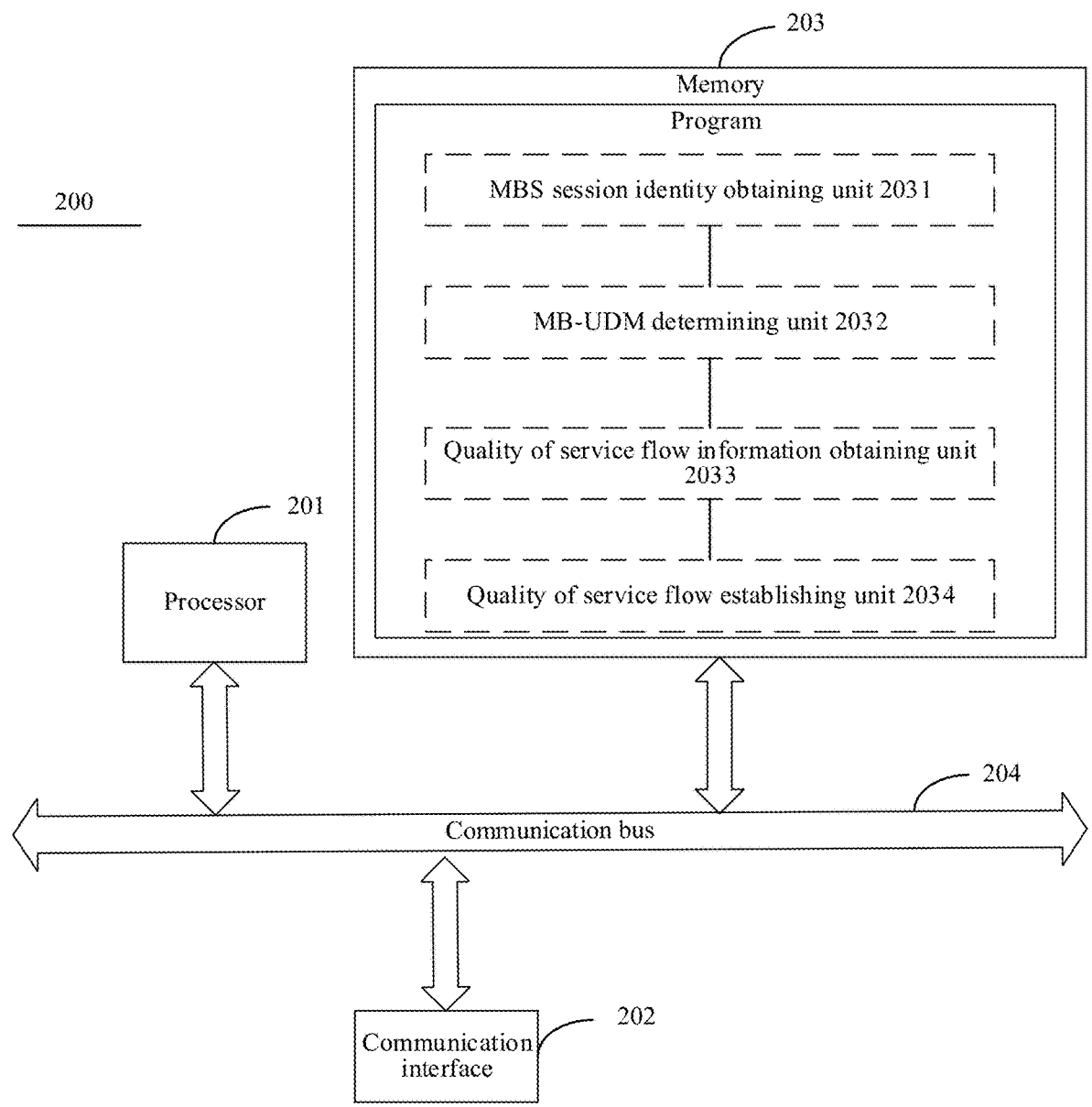
FIG. 11 is a schematic block diagram of a session management function according to certain embodiment(s) of the present disclosure.

FIG. 11 schematically shows a block diagram of an SMF 200 corresponding to a user equipment according to an embodiment of the present disclosure. As shown in FIG. 11, the SMF 200 provided in this embodiment of the present disclosure may include: one or more processors 201; and a storage apparatus 203, configured to store one or more computer-readable instructions, the one or more computer-readable instructions, when executed by the one or more processors 201, causing the one or more processors 201 to implement the method according to any of the embodiments. The user equipment is already handed over from a source base station to a target base station, the source base station supports an MBS, the target base station does not support the MBS, and the user equipment already activates an MBS session on the source base station before handover and has not established a PDU session associated with the activated MBS session on the source base station.

The computer-readable instructions may further be configured to obtain an MBS session identity of the activated MBS session in a process of establishing a PDU session on a target base station side triggered by the user equipment, S-NSSAI of the PDU session being the same as S-NSSAI of the MBS session, and a DNN of the PDU session being the same as a DNN of the MBS session; determine an MB-UDM of the MBS session according to the MBS session identity; obtain quality of service flow information corresponding to the activated MBS session from the MB-UDM according to the MBS session identity, there being one or more pieces of quality of service flow information; and establish a quality of service flow corresponding to the MBS session in the PDU session according to the quality of service flow information corresponding to the activated MBS session, there being one or more quality of service flows.

Referring to FIG. 11, the program may further include: an MBS session identity obtaining unit 2031, configured to obtain an MBS session identity of the activated MBS session in a process of establishing a PDU session on a target base station side triggered by the user equipment, S-NSSAI of the PDU session being the same as S-NSSAI of the MBS session, and a DNN of the PDU session being the same as a DNN of the MBS session; an MB-UDM determining unit 2032, configured to determine an MB-UDM of the MBS session according to the MBS session identity; a quality of service flow information obtaining unit 2033, configured to obtain quality of service flow information corresponding to the activated MBS session from the MB-UDM according to the MBS session identity, there being one or more pieces of quality of service flow information; and a quality of service flow establishing unit 2034, configured to establish a quality of service flow corresponding to the MBS session in the PDU session according to the quality of service flow information corresponding to the activated MBS session, there being one or more quality of service flows.

In an exemplary embodiment, the MBS session identity obtaining unit 2031 may be configured to receive a PDU session establishment session management context request message from an AMF, the PDU session establishment session management context request message including the MBS session identity.

In an exemplary embodiment, the PDU session establishment session management context request message may further include the S-NSSAI, the DNN, a request type, and an N1 session management container, the request type indicating an existing MBS session, and the N1 session management container carrying a PDU session establishment request.

In an exemplary embodiment, the MB-UDM determining unit 2032 may be configured to transmit an NF discovery request message to an NRF, the NF discovery request message including the MBS session identity and an NF type, and the NF type indicating an MBS UDM, so that the NRF determines an MB-UDM identity of the MB-UDM according to the MBS session identity and the NF type; and receive an NF discovery response message returned by the NRF in response to the NF discovery request message, the NF discovery response message carrying the MB-UDM identity.

In an exemplary embodiment, the program may further include: an MBS session context subscribe request message transmitting unit, configured to transmit an MBS session context subscribe request message to the MB-UDM according to the MB-UDM identity before the quality of service flow information corresponding to the activated MBS session is obtained from the MB-UDM according to the MBS session identity, the MBS session context subscribe request message including the MBS session identity, a notification correlation identity, and an MB-SMF identity of the MBS session, so that the MB-UDM causes, according to the MBS session identity, the SMF to subscribe to the MB-UDM, the notification correlation identity, and the MB-SMF identity; and An MBS session context subscribe response message receiving unit, configured to receive an MBS session context subscribe response message returned by the MB-UDM in response to the MBS session context subscribe request message.

In an exemplary embodiment, the quality of service flow information obtaining unit 2033 may be configured to receive an MBS session context get request message transmitted by the SMF, the MBS session context get request message including the MBS session identity; and receive an MBS session context get response message returned by the MB-UDM in response to the MBS session context get request message, the MBS session context get response message carrying MBS session context information, the MBS session context information including the MBS session identity, the MB-SMF identity, an MB-UPF identity of the MBS session, an MB-PCF identity, and the quality of service flow information corresponding to the MBS session.

In an exemplary embodiment, the program may further include: a UPF selection unit, configured to select a UPF after the quality of service flow information corresponding to the activated MBS session is obtained from the MB-UDM according to the MBS session identity; and a UE-PCF selection unit, configured to select a UE-PCF. In response to a determination that the SMF is the same as an MB-SMF of the MBS session, an MB-UPF of the MBS session is selected as the UPF, and an MB-PCF of the MBS session is selected as the UE-PCF, and the MBS session context get response message further includes multicast broadcast user plane function access information or a transport layer Internet protocol multicast address and a common tunnel endpoint identity.

In an exemplary embodiment, the quality of service flow establishing unit 2034 may be configured to transmit a communication N1N2 message transfer message to an AMF during establishment of the PDU session, so that the AMF establishes the quality of service flow corresponding to the MBS session in the PDU session according to the quality of service flow information corresponding to the activated MBS session.

In an exemplary embodiment, the program may further include: a UE-PCF preferential selection unit, configured to select a UE-PCF according to the MBS session identity after the quality of service flow information corresponding to the activated MBS session is obtained from the MB-UDM according to the MBS session identity, to preferentially select an MB-UPF of the MBS session as the UE-PCF.

In an exemplary embodiment, the program may further include: a UE-UDM determining unit, configured to determine a UE-UDM according to an SUPI of the user equipment before the MB-UDM of the MBS session is determined according to the MBS session identity; an MBS session management subscription data obtaining unit, configured to obtain MBS session management subscription data of the MBS session from the UE-UDM according to the SUPI; and a subscribed confirmation unit, configured to determine, according to the MBS session management subscription data, that the S-NSSAI and the DNN have been subscribed to the UE-UDM.

For a specific implementation of the SMF provided in this embodiment of the present disclosure, reference may be made to the content of the method for implementing handover of a multicast broadcast service. Details are not described herein again.

Figure 12:
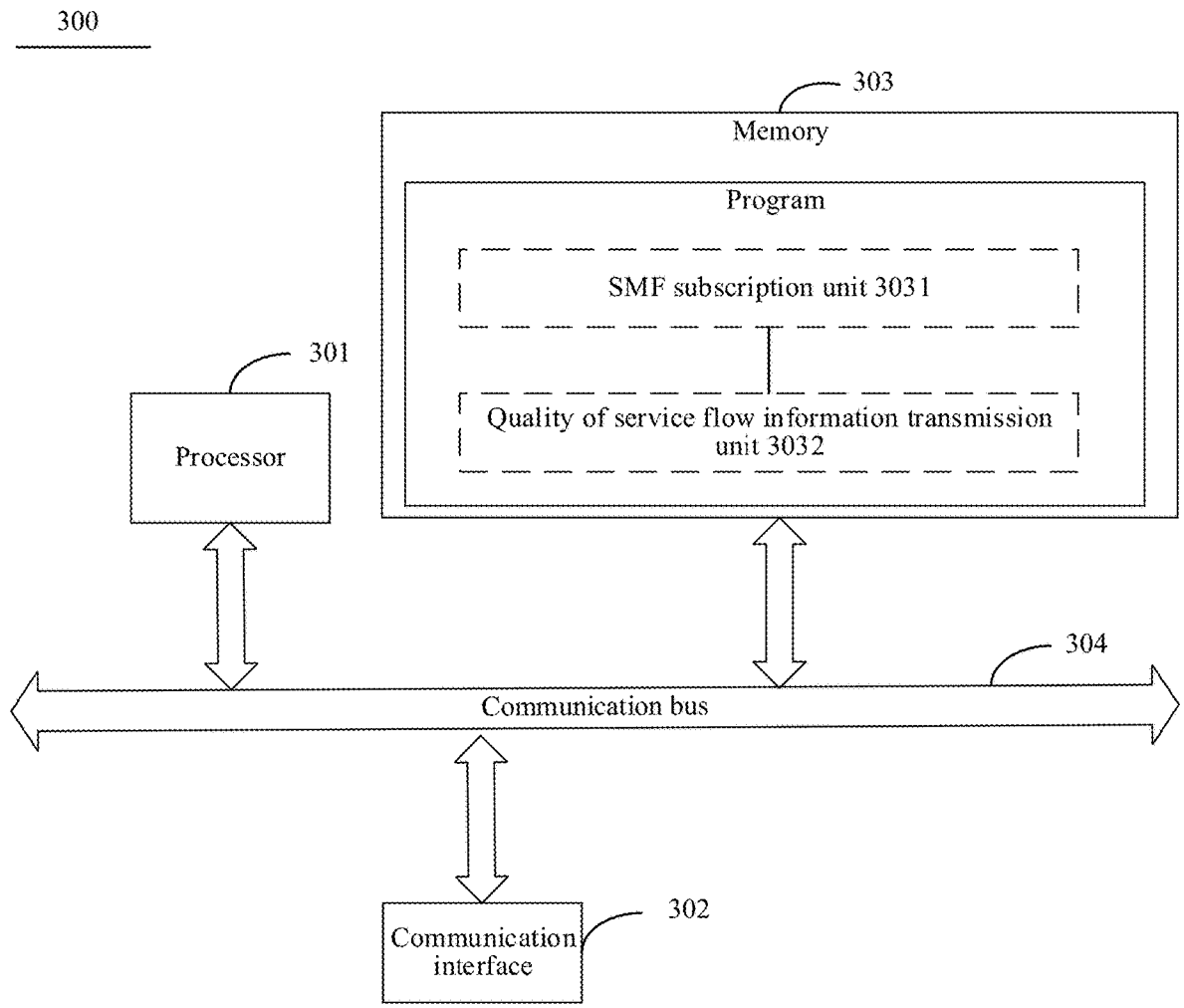
FIG. 12 is a schematic block diagram of a multicast broadcast unified data management function according to certain embodiment(s) of the present disclosure.

FIG. 12 schematically shows a block diagram of an MB-UDM 300 corresponding to a user equipment according to an embodiment of the present disclosure. As shown in FIG. 12, the MB-UDM 300 provided in this embodiment of the present disclosure may include: one or more processors 301; and a storage apparatus 303, configured to store one or more computer-readable instructions, the one or more computer-readable instructions, when executed by the one or more processors 301, causing the one or more processors 301 to implement the method according to any of the embodiments. The user equipment is already handed over from a source base station to a target base station, the source base station supports an MBS, the target base station does not support the MBS, and the user equipment already activates an MBS session on the source base station before handover and has not established a PDU session associated with the activated MBS session on the source base station.

The computer-readable instructions may further be configured to cause an SMF to subscribe to the MB-UDM according to an MBS session identity of the activated MBS session in a process of establishing a PDU session on a target base station side triggered by the user equipment, S-NSSAI of the PDU session being the same as S-NSSAI of the MBS session, and a DNN of the PDU session being the same as a DNN of the MBS session; and transmit quality of service flow information corresponding to the activated MBS session to the SMF, so that the SMF establishes a quality of service flow corresponding to the activated MBS session in the PDU session, there being one or more pieces of quality of service flow information.

Referring to FIG. 12, the program may further include: an SMF subscription unit 3031, configured to cause an SMF to subscribe to the MB-UDM according to an MBS session identity of the activated MBS session in a process of establishing a PDU session on a target base station side triggered by the user equipment, S-NSSAI of the PDU session being the same as S-NSSAI of the MBS session, and a DNN of the PDU session being the same as a DNN of the MBS session; and a quality of service flow information transmission unit 3032, configured to transmit quality of service flow information corresponding to the activated MBS session to the SMF, so that the SMF establishes a quality of service flow corresponding to the activated MBS session in the PDU session, there being one or more pieces of quality of service flow information.

In an exemplary embodiment, the SMF subscription unit 3031 may be configured to receive an MBS session context subscribe request message transmitted by the SMF, the MBS session context subscribe request message including the MBS session identity, a notification correlation identity, and an MB-SMF identity of the MBS session; cause the SMF to subscribe to the MB-UDM according to the MBS session identity, the notification correlation identity, and the MB-SMF identity; and return an MBS session context subscribe response message to the SMF in response to the MBS session context subscribe request message.

In an exemplary embodiment, the quality of service flow information transmission unit 3032 may further include an MBS session context get request message receiving unit, configured to receive an MBS session context get request message transmitted by the SMF, the MBS session context get request message including the MBS session identity; and an MBS session context get response message transmission unit, configured to return an MBS session context get response message to the SMF in response to the MBS session context get request message, the MBS session context get response message carrying MBS session context information. The MBS session context information may include the MBS session identity, the MB-SMF identity, an MB-UPF identity of the MBS session, an MB-PCF identity, and the quality of service flow information corresponding to the MBS session.

In an exemplary embodiment, the MBS session context get response message transmission unit may be configured to transmit a data management query request message to an MB-UDR in response to the MBS session context get request message, a key in the data management query request message indicating the MBS session identity, and a type indicating the MBS session context information; receive a data management query response message returned by the MB-UDR in response to the data management query request message, a key carried in the data management query response message indicating the MBS session identity, a type indicating MBS session information, and data including the MB-SMF identity, the MB-UPF identity, the MB-PCF identity, and the quality of service flow information corresponding to the MBS session; and return the MBS session context get response message to the SMF.

In an exemplary embodiment, the program may further include: an MBS session context update request message receiving unit, configured to receive an MBS session context update request message from an MB-SMF before the quality of service flow information corresponding to the activated MBS session is transmitted to the SMF, the MBS session context update request message carrying the MBS session identity, an MB-SMF identity, an MB-UPF identity, an MB-PCF identity, and the quality of service flow information corresponding to the activated MBS session; a quality of service flow information storage unit, configured to store the MBS session identity, the MB-SMF identity, the MB-UPF identity, the MB-PCF identity, and the quality of service flow information corresponding to the activated MBS session in the MB-UDM; a data management create/update request message transmission unit, configured to transmit a data management create/update request message to an MB-UDR, the data management create/update request message carrying the MBS session identity and MBS session information, the MBS session information including the MB-SMF identity, the MB-UPF identity, the MB-PCF identity, and the quality of service flow information corresponding to the MBS session, so that the MBS session identity and the MBS session information are stored in the MB-UDR; a data management create/update response message receiving unit, configured to receive a data management create/update response message returned by the MB-UDR in response to the data management create/update request message; and an MBS session context update response message returning unit, configured to return an MBS session context update response message to the MB-SMF in response to the MBS session context update request message.

In an exemplary embodiment, the program may further include: an MBS session context registration request message receiving unit, configured to receive an MBS session context registration request message from the MB-SMF before the MBS session context update request message is received from the MB-SMF, the MBS session context registration request message including the MBS session identity and the MB-SMF identity; an MB-SMF registration unit, configured to register the MB-SMF with the MB-UDM according to the MBS session identity and the MB-SMF identity; and an MBS session context registration response message returning unit, configured to return an MBS session context registration response message to the MB-SMF in response to the MBS session context registration request message.

For a specific implementation of the MB-UDM provided in this embodiment of the present disclosure, reference may be made to the content of the method for implementing handover of a multicast broadcast service. Details are not described herein again.

FIG. 10, FIG. 11, and FIG. 12 are schematic structural diagrams of the user equipment 100, the SMF 200, and the MB-UDM 300 adapted to implement the embodiments of the present disclosure. The structures shown in FIG. 10, FIG. 11, and FIG. 12 are merely examples, and are not to impose any limitation on a function and use scope of the embodiments of the present disclosure.

Referring to FIG. 10, FIG. 11, and FIG. 12, each of the user equipment 100, the SMF 200, and the MB-UDM 300 provided in the embodiments of the present disclosure may further include: a communication interface (102, 202, 302) and a communication bus (104, 204, 304). The processor (101, 201, 301), the communication interface (102, 202, 302), and the memory (103, 203, 303) communicate with each other through the communication bus (104, 204, 304). In certain embodiment(s), the communication interface (102, 202, 302) may be an interface of a communication module such as an interface of a global system for mobile communications (GSM) module. The processor (101, 201, 301) is configured to store computer-readable instructions. The memory (103, 203, 303) is configured to store the computer-readable instructions. The processor (101, 201, 301) may be a central processing unit (CPU) or an application specific integrated circuit (ASIC) or may be configured as one or more integrated circuits for implementing the embodiments of the present disclosure. In addition, the memory (103, 203, 303) may include a high-speed random access memory (RAM), and may also include a non-volatile memory, for example, at least one magnetic disk storage device.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Particularly, according to an embodiment of the present disclosure, the processes described below by referring to the flowcharts may be implemented as computer software programs. For example, an embodiment of the present disclosure includes a computer program product, including computer-readable instructions carried on a computer-readable storage medium. The computer-readable medium shown in the present disclosure may be a computer-readable signal medium or a computer-readable storage medium or any combination thereof.

What is claimed is:

1. A method for implementing handover of a multicast broadcast service (MBS), applied to a user equipment (UE), a source base station that the UE accesses before the handover supporting the MBS before the handover, the UE having already activated an MBS session on the source base station before the handover, and the UE not establishing any protocol data unit (PDU) session associated with the activated MBS session before the handover, and the method comprising:
   receiving a handover complete indication transmitted by a target base station, the handover complete indication being used for indicating that the UE has been handed over to the target base station; and
   triggering establishment of a PDU session on a target base station side in response to a determination that the target base station does not support the MBS, single network slice selection assistance information (S-NSSAI) of the PDU session being the same as S-NSSAI of the activated MBS session, and a data network name (DNN) of the PDU session being the same as a DNN of the activated MBS session, so that one or more quality of service (QOS) flows corresponding to the activated MBS session are established in the PDU session.

2. The method according to claim 1, wherein triggering the establishment of the PDU session comprises:
   transmitting a non-access stratum message to an access and mobility management function (AMF), the non-access stratum message carrying a request type, and the request type indicating an existing MBS session, so that the AMF selects, according to a value of the request type, a session management function (SMF) for newly establishing the PDU session.

3. The method according to claim 2, wherein the non-access stratum message further carries the S-NSSAI, the DNN, and an MBS session identity of the MBS session, so that the SMF establishes the PDU session according to the S-NSSAI, the DNN, and the MBS session identity and establishes the one or more QoS flows corresponding to the activated MBS session in the PDU session.

4. The method according to claim 3, wherein the non-access stratum message further carries a PDU session identity corresponding to the PDU session and an N1 session management container, the N1 session management container carrying a PDU session establishment request.

5. The method according to claim 1, wherein triggering the establishment of the PDU session comprises:
   establishing a corresponding PDU session for each MBS session in response to a determination that the UE has activated a plurality of MBS sessions on the source base station before the handover, S-NSSAI of each MBS session being the same as S-NSSAI of a corresponding PDU session, and a DNN of each MBS session being the same as a DNN of the corresponding PDU session.

6. The method according to claim 1, further comprising:
   performing, in response to a determination that the UE is changed to a new tracking area, a registration procedure of registering the UE with a network,
   the establishment of the PDU session on the target base station side being triggered before the registration procedure or after the registration procedure.

7. The method according to claim 1, wherein determining that the target base station does not support the MBS comprises:
   receiving a system information block broadcasted by the target base station, and
   determining, according to the system information block, that the target base station does not support the MBS; or obtaining a target service area of the MBS, and determining, according to the target service area, that the target base station does not support the MBS.

8. The method according to claim 1, further comprising:
   triggering a service request procedure, so that the UE enters a connected state.

9. The method according to claim 1, further comprising:
   performing a registration procedure of which a registration type is mobility registration update, so that the UE enters a connected state.

10. A user equipment (UE), comprising: a memory storing computer program instructions; and a processor coupled to the memory and configured to execute the computer program instructions and perform a method for implementing handover of a multicast broadcast service (MBS), applied to the UE, a source base station that the UE accesses before the handover supporting the MBS before the handover, and the UE having already activated an MBS session on the source base station before the handover, and the UE not establishing any protocol data unit (PDU) session associated with the activated MBS session before the handover; and the method including:
   receiving a handover complete indication transmitted by a target base station, the handover complete indication being used for indicating that the UE has been handed over to the target base station; and
   triggering establishment of a PDU session on a target base station side in response to a determination that the target base station does not support the MBS, single network slice selection assistance information (S-NSSAI) of the PDU session being the same as S-NSSAI of the activated MBS session, and a data network name (DNN) of the PDU session being the same as a DNN of the activated MBS session, so that one or more quality of service (QOS) flows corresponding to the activated MBS session is established in the PDU session.

11. The UE according to claim 10, wherein triggering the establishment of the PDU session includes:
transmitting a non-access stratum message to an access and mobility management function (AMF), the non-access stratum message carrying a request type, and the request type indicating an existing MBS session, so that the AMF selects, according to a value of the request type, a session management function (SMF) for newly establishing the PDU session.

12. The UE according to claim 11, wherein the non-access stratum message further carries the S-NSSAI, the DNN, and an MBS session identity of the MBS session, so that the SMF establishes the PDU session according to the S-NSSAI, the DNN, and the MBS session identity and establishes the one or more QoS flows corresponding to the activated MBS session in the PDU session.

13. The UE according to claim 12, wherein the non-access stratum message further carries a PDU session identity corresponding to the PDU session and an N1 session management container, the N1 session management container carrying a PDU session establishment request.

14. The UE according to claim 10, wherein triggering the establishment of the PDU session includes:
establishing a corresponding PDU session for each MBS session in response to a determination that the UE has activated a plurality of MBS sessions on the source base station before the handover, S-NSSAI of each MBS session being the same as S-NSSAI of a corresponding PDU session, and a DNN of each MBS session being the same as a DNN of the corresponding PDU session.

15. The UE according to claim 10, wherein the method further includes:
performing, in response to a determination that the UE is changed to a new tracking area, a registration procedure of registering the UE with a network,
the establishment of the PDU session on the target base station side being triggered before the registration procedure or after the registration procedure.

16. The UE according to claim 10, wherein determining that the target base station does not support the MBS includes:
receiving a system information block broadcasted by the target base station, and
determining, according to the system information block, that the target base station does not support the MBS; or obtaining a target service area of the MBS, and determining, according to the target service area, that the target base station does not support the MBS.

17. The UE according to claim 10, wherein the method further includes:
triggering a service request procedure, so that the UE enters a connected state.

18. The UE according to claim 10, wherein the method further includes:
performing a registration procedure of which a registration type is mobility registration update, so that the UE enters a connected state.

19. A non-transitory computer-readable storage medium storing computer program instructions executable by at least one processor to perform a method for implementing handover of a multicast broadcast service (MBS), applied to a user equipment (UE), a source base station that the UE accesses before the handover supporting the MBS before the handover, the UE having already activated an MBS session on the source base station before the handover, and the UE not establishing any protocol data unit (PDU) session associated with the activated MBS session before the handover; and the method including:
receiving a handover complete indication transmitted by a target base station, the handover complete indication being used for indicating that the UE has been handed over to the target base station; and
triggering establishment of a PDU session on a target base station side in response to a determination that the target base station does not support the MBS, single network slice selection assistance information (S-NSSAI) of the PDU session being the same as S-NSSAI of the activated MBS session, and a data network name (DNN) of the PDU session being the same as a DNN of the activated MBS session, so that one or more quality of service (QOS) flows corresponding to the activated MBS session is established in the PDU session.

20. The non-transitory computer-readable storage medium according to claim 19, wherein triggering the establishment of the PDU session includes:
transmitting a non-access stratum message to an access and mobility management function (AMF), the non-access stratum message carrying a request type, and the request type indicating an existing MBS session, so that the AMF selects, according to a value of the request type, a session management function (SMF) for newly establishing the PDU session.

* * * * *